(12) United States Patent
Roman

(10) Patent No.: US 8,537,898 B2
(45) Date of Patent: *Sep. 17, 2013

(54) COMPRESSION WITH DOPPLER ENHANCEMENT

(75) Inventor: Kendyl A. Roman, Sunnyvale, CA (US)

(73) Assignee: Zin Stai Pte. IN, LLC, Dover, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/270,533

(22) Filed: Oct. 11, 2011

(65) Prior Publication Data

US 2012/0027315 A1    Feb. 2, 2012

Related U.S. Application Data

(60) Division of application No. 12/004,575, filed on Dec. 21, 2007, now Pat. No. 8,068,544, which is a continuation-in-part of application No. 11/638,989, filed on Dec. 13, 2006, now Pat. No. 7,991,052, which is a continuation of application No. 09/467,721, filed on Dec. 20, 1999, now Pat. No. 7,233,619.

(60) Provisional application No. 60/113,051, filed on Dec. 21, 1998.

(51) Int. Cl.
    *H04B 1/66* (2006.01)

(52) U.S. Cl.
    USPC ............ 375/240.17; 375/240.25; 375/240.26; 375/240.24; 375/240.23; 382/237; 382/233; 382/235; 382/245; 382/246; 382/247; 382/166

(58) Field of Classification Search
    USPC ............ 375/240.17, 240.24, 240.23, 240.26, 375/240.25; 382/237, 245, 246, 247, 166, 382/233, 235
    See application file for complete search history.

(56) References Cited

U.S. PATENT DOCUMENTS

| | | | |
|---|---|---|---|
| 4,301,469 A | 11/1981 | Modeen et al. | |
| 4,302,775 A | 11/1981 | Widergren et al. | |

(Continued)

FOREIGN PATENT DOCUMENTS

| | | |
|---|---|---|
| WO | 9959472 A1 | 11/1999 |
| WO | 0055791 A1 | 9/2000 |

OTHER PUBLICATIONS

Office Action, mailed Dec. 15, 2003, for related U.S. Appl. No. 09/758,573.

(Continued)

*Primary Examiner* — Shawn An
(74) *Attorney, Agent, or Firm* — Schwabe, Williamson & Wyatt, P.C.

(57) ABSTRACT

Methods, medium, and machines which compress, enhance, encode, transmit, decode, decompress and display digital video images. Real time compression is achieved by sub-sampling each frame of a video signal, filtering the pixel values, and encoding. Real time transmission is achieved due to high levels of effective compression. Real time decompression is achieved by decoding and decompressing the encoded data to display high quality images. A receiver can alter various setting including, but not limited to, the format for the compression, image size, frame rate, brightness and contrast. In a Doppler improvement aspect of the invention, Doppler velocity scales are incorporated into grayscale compression methods using two bits. Variable formats may be selected and Doppler encoding can be turned on and off based on the image content. Frames or sets of pixels may be distinguished by automated analysis of the characteristics of an image, such as the presence of Doppler enhanced pixels.

9 Claims, 25 Drawing Sheets

(56) References Cited

U.S. PATENT DOCUMENTS

| | | | |
|---|---|---|---|
| 4,385,363 A | 5/1983 | Widergren et al. | |
| 4,394,774 A | 7/1983 | Widergren et al. | |
| 4,410,916 A | 10/1983 | Pratt et al. | |
| 4,546,385 A | 10/1985 | Anastassiou | |
| 4,550,437 A | 10/1985 | Kobayashi et al. | |
| 4,646,356 A | 2/1987 | Anderson et al. | |
| 4,698,672 A | 10/1987 | Chen et al. | |
| 4,704,628 A | 11/1987 | Chen et al. | |
| 4,743,959 A | 5/1988 | Frederiksen | |
| 5,014,710 A * | 5/1991 | Maslak et al. | 600/441 |
| 5,046,027 A | 9/1991 | Taaffe et al. | |
| 5,047,853 A | 9/1991 | Hoffert et al. | |
| 5,271,072 A | 12/1993 | Yoshida et al. | |
| 5,287,452 A | 2/1994 | Newman | |
| 5,309,232 A | 5/1994 | Hartung et al. | |
| 5,339,392 A | 8/1994 | Risberg et al. | |
| 5,416,602 A | 5/1995 | Inga et al. | |
| 5,471,989 A | 12/1995 | Roundhill et al. | |
| 5,552,832 A | 9/1996 | Astle | |
| 5,581,613 A | 12/1996 | Nagashima et al. | |
| 5,583,561 A | 12/1996 | Baker et al. | |
| 5,619,995 A | 4/1997 | Lobodzinski | |
| 5,621,660 A | 4/1997 | Chaddha et al. | |
| 5,646,618 A | 7/1997 | Walsh | |
| 5,684,968 A | 11/1997 | Flurry | |
| 5,696,940 A | 12/1997 | Liu et al. | |
| 5,715,823 A | 2/1998 | Wood et al. | |
| 5,721,815 A | 2/1998 | Ottesen et al. | |
| 5,754,820 A | 5/1998 | Yamagami | |
| 5,794,072 A | 8/1998 | Nomura et al. | |
| 5,809,145 A | 9/1998 | Silk et al. | |
| 5,812,119 A * | 9/1998 | Tateyama | 345/555 |
| 5,812,788 A | 9/1998 | Agarwal | |
| 5,828,856 A | 10/1998 | Bowes et al. | |
| 5,860,068 A | 1/1999 | Cook | |
| 5,882,206 A | 3/1999 | Gillio | |
| 5,897,498 A | 4/1999 | Canfield, II et al. | |
| 5,920,317 A | 7/1999 | McDonald | |
| 5,959,639 A | 9/1999 | Wada | |
| 5,966,728 A | 10/1999 | Amini et al. | |
| 5,973,750 A | 10/1999 | Ogawa et al. | |
| 5,999,655 A | 12/1999 | Kalker et al. | |
| 6,005,979 A | 12/1999 | Chang et al. | |
| 6,009,346 A | 12/1999 | Ostrow | |
| 6,018,713 A | 1/2000 | Coli et al. | |
| 6,025,854 A | 2/2000 | Hinz et al. | |
| 6,054,990 A | 4/2000 | Tran | |
| 6,058,215 A | 5/2000 | Schwartz et al. | |
| 6,063,032 A | 5/2000 | Grundwald | |
| 6,064,324 A | 5/2000 | Shimizu et al. | |
| 6,078,691 A | 6/2000 | Luttmer | |
| 6,084,598 A | 7/2000 | Chekerylla | |
| 6,091,777 A | 7/2000 | Guetz et al. | |
| 6,115,485 A * | 9/2000 | Dumoulin et al. | 382/128 |
| 6,144,392 A | 11/2000 | Rogers | |
| 6,181,711 B1 | 1/2001 | Zhang et al. | |
| 6,219,358 B1 | 4/2001 | Pinder et al. | |
| 6,230,241 B1 | 5/2001 | McKenney | |
| 6,324,599 B1 | 11/2001 | Zhou et al. | |
| 6,335,990 B1 | 1/2002 | Chen et al. | |
| 6,338,119 B1 | 1/2002 | Anderson et al. | |
| 6,339,616 B1 | 1/2002 | Kovalev | |
| 6,384,862 B1 | 5/2002 | Brusewitz et al. | |
| 6,571,392 B1 | 5/2003 | Zigmond et al. | |
| 6,574,278 B1 | 6/2003 | McVeigh et al. | |
| 6,592,629 B1 | 7/2003 | Cullen et al. | |
| 6,621,933 B2 | 9/2003 | Chung et al. | |
| 6,651,113 B1 | 11/2003 | Grimsrud | |
| 7,016,417 B1 | 3/2006 | Roman et al. | |
| 7,257,158 B1 | 8/2007 | Figueredo et al. | |
| 7,308,413 B1 | 12/2007 | Tota et al. | |
| 7,490,060 B2 | 2/2009 | Brown et al. | |
| 2007/0223574 A1 | 9/2007 | Roman et al. | |

OTHER PUBLICATIONS

Final Office Action, mailed Aug. 16, 2004, for related U.S. Appl. No. 09/758,573.
Office Action, mailed Jan. 20, 2006, for related U.S. Appl. No. 09/758,573.
Office Action, mailed Sep. 27, 2006, for related U.S. Appl. No. 09/758,573.
Final Office Action, mailed Jun. 14, 2007, for related U.S. Appl. No. 09/758,573.
Office Action, mailed Nov. 24, 2008, for related U.S. Appl. No. 09/758,573.
Final Office Action, mailed May 12, 2009, for related U.S. Appl. No. 09/758,573.
Office Action, mailed Jul. 11, 2002, for related U.S. Appl. No. 09/470,566.
Final Office Action, mailed Mar. 26, 2003, for related U.S. Appl. No. 09/470,566.
Office Action, mailed Dec. 3, 2003, for related U.S. Appl. No. 09/470,566.
Final Office Action, mailed Jul. 14, 2004, for related U.S. Appl. No. 09/470,566.
Office Action, mailed Apr. 8, 2005, for related U.S. Appl. No. 09/470,566.
Notice of Allowability, mailed Aug. 10, 2005, for related U.S. Appl. No. 09/470,566.
Office Action, mailed Jan. 28, 2008, for related U.S. Appl. No. 11/280,656.
Notice of Allowability, mailed Mar. 5, 2009, for related U.S. Appl. No. 11/280,656.
Office Action, mailed Sep. 26, 2002, for related U.S. Appl. No. 09/467,721.
Final office Action, mailed Jan. 29, 2004, for related U.S. Appl. No. 09/467,721.
Office Action, mailed May 24, 2004, for related U.S. Appl. No. 09/467,721.
Office Action, mailed Apr. 20, 2005, for related U.S. Appl. No. 09/467,721.
Office Action, mailed Nov. 29, 2005, for related U.S. Appl. No. 09/467,721.
Notice of Allowability, mailed Aug. 22, 2006, for related U.S. Appl. No. 09/467,721.
Office Action, mailed Nov. 18, 2002, for related U.S. Appl. No. 09/473,190.
Office Action, mailed Dec. 11, 2003, for related U.S. Appl. No. 09/473,190.
Office Action, mailed Jun. 21, 2007, for related U.S. Appl. No. 09/473,190.
Office Action, mailed Jul. 7, 2009, for related U.S. Appl. No. 10/154,775.
Ziv et al., "Compression of Individual Sequences via Variable-Rate Coding," Sep. 5, 1978, IEEE Transactions on Information Theory, vol. IT-24, No. 5, 7 pages.
Terry A. Welch, "A Technique for High-Performance Data Compression", Jun. 1984, 12 pages, Sperry Research Center, issue of IEEE Computer.
David A. Huffman, "A Method for Construction of Minimum Redundancy Codes", Published in 1952, 4 pages, Proceedings of the I.R.E.
Ziv et al., "A Universal Algorithm for Sequential Data Compression", May 1977, 7 pages, IEEE Transactions on Information Theory, vol. IT-23, No. 3.
Final Office Action, mailed Jan. 13, 2010, for related U.S. Appl. No. 10/154,775.
Restriction Requirement, mailed Feb. 7, 2011, for related U.S. Appl. No. 12/004,575.
Office Action, mailed Apr. 4, 2011, for related U.S. Appl. No. 12/004,575.
Notice of Allowability, mailed Aug. 8, 2011, for related U.S. Appl. No. 12/004,575.

* cited by examiner

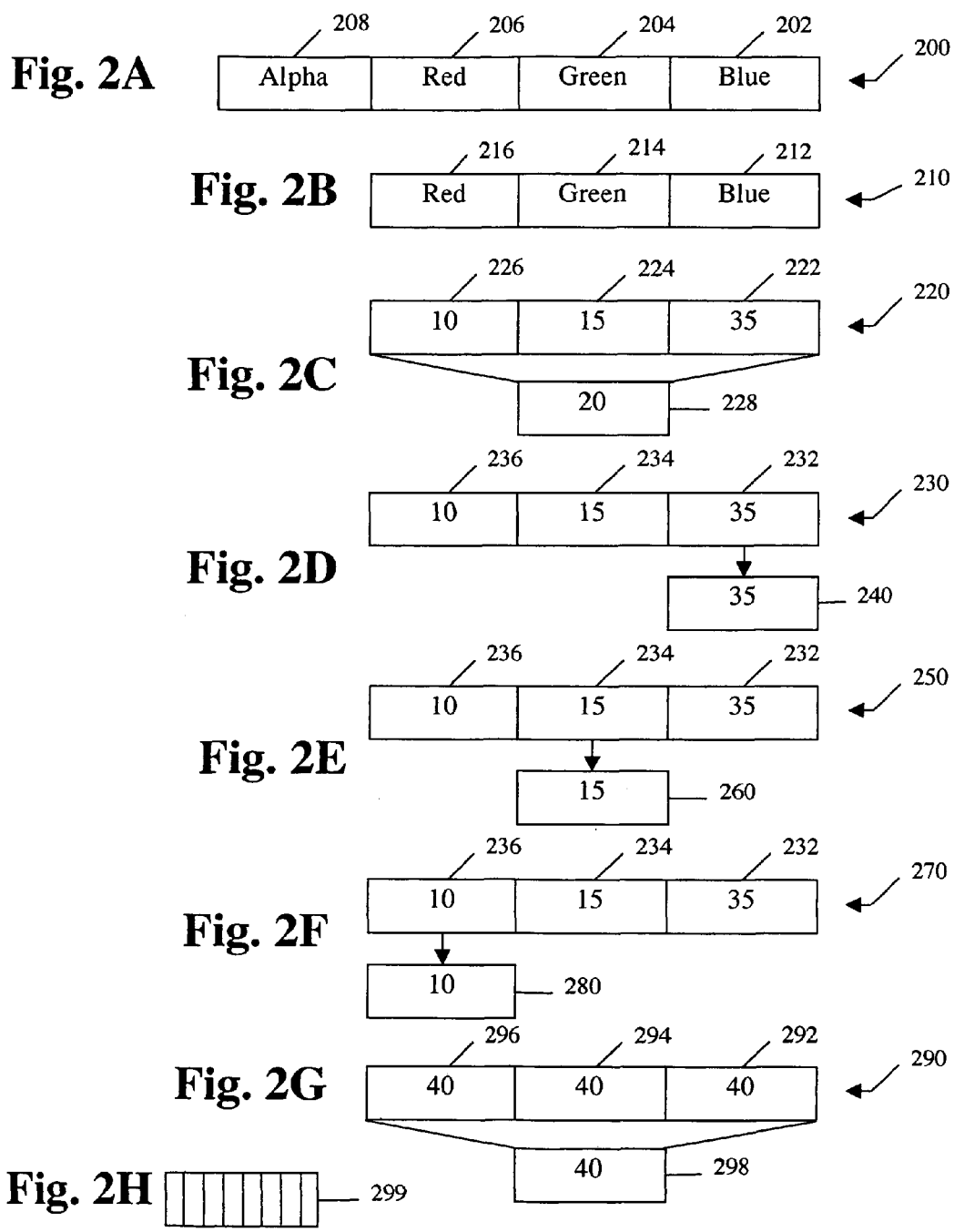

RHN FORMAT

```
// N=3, W=8
unsigned char encodeTable[ ] =
{
        5,  0,  7,  4,  2,  3,  6,  1
};
```

Fig. 11A

```
// N=3, U=5
int decodeTable[ ] =
{
        0xff << 24  |  1 << (16+U)  |  1 << (8+U)  |  1 << U,   // 0 → 1
        0xff << 24  |  7 << (16+U)  |  7 << (8+U)  |  7 << U,   // 1 → 7
        0xff << 24  |  4 << (16+U)  |  4 << (8+U)  |  4 << U,   // 2 → 4
        0xff << 24  |  5 << (16+U)  |  5 << (8+U)  |  5 << U,   // 3 → 5
        0xff << 24  |  3 << (16+U)  |  3 << (8+U)  |  3 << U,   // 4 → 3
        0xff << 24  |  0 << (16+U)  |  0 << (8+U)  |  0 << U,   // 5 → 0
        0xff << 24  |  6 << (16+U)  |  6 << (8+U)  |  6 << U,   // 6 → 6
        0xff << 24  |  2 << (16+U)  |  2 << (8+U)  |  2 << U    // 7 → 2
};
```

Fig. 11B

```
// N=3, U=5
int redDecodeTable[ ] =
{
        0xff << 24  |  1 << (16+U)  |  0 << (8+U)  |  0 << U,   // 0 → 1
        0xff << 24  |  7 << (16+U)  |  0 << (8+U)  |  0 << U,   // 1 → 7
        0xff << 24  |  4 << (16+U)  |  0 << (8+U)  |  0 << U,   // 2 → 4
        0xff << 24  |  5 << (16+U)  |  0 << (8+U)  |  0 << U,   // 3 → 5
        0xff << 24  |  3 << (16+U)  |  0 << (8+U)  |  0 << U,   // 4 → 3
        0xff << 24  |  0 << (16+U)  |  0 << (8+U)  |  0 << U,   // 5 → 0
        0xff << 24  |  6 << (16+U)  |  0 << (8+U)  |  0 << U,   // 6 → 6
        0xff << 24  |  2 << (16+U)  |  0 << (8+U)  |  0 << U    // 7 → 2
};
```

Fig. 11C

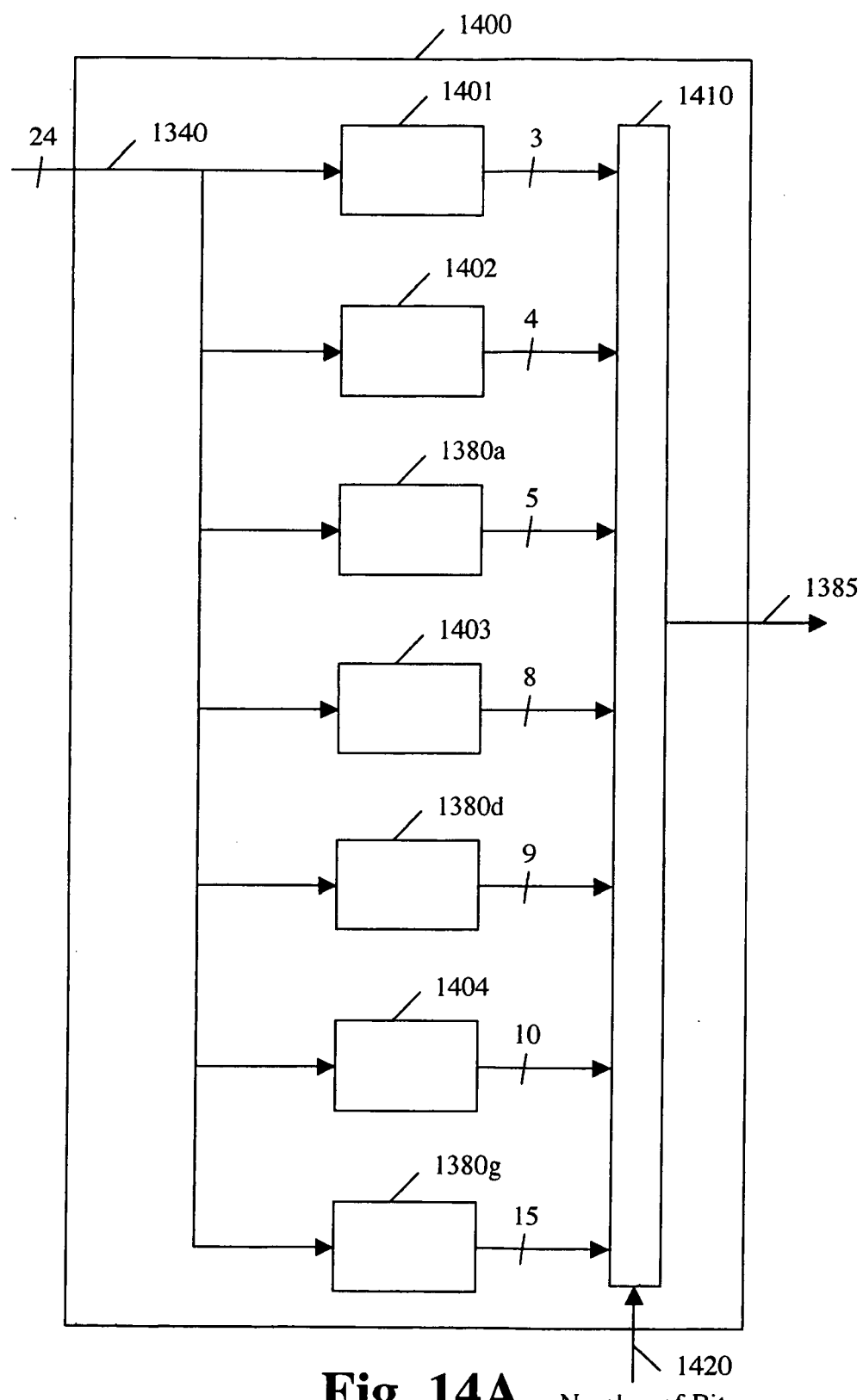
Fig. 14A   Number of Bits

COMPRESSION WITH DOPPLER ENHANCEMENT

CROSS-REFERENCE TO RELATED APPLICATIONS

This application is a division application of U.S. patent application Ser. No. 12/004,575, filed on Dec. 21, 2007, entitled "COMPRESSION WITH DOPPLER ENHANCEMENT," which is a continuation-in-part of application Ser. No. 11/638,989, filed Dec. 13, 2006, entitled "VARIABLE GENERAL PURPOSE COMPRESSION FOR VIDEO IMAGES (ZLN)," docket ZLN2, which hereby is incorporated by reference.

Application Ser. No. 11/638,989 is a continuation of U.S. patent application Ser. No. 09/467,721, filed on Dec. 20, 1999, entitled "VARIABLE GENERAL PURPOSE COMPRESSION FOR VIDEO IMAGES (ZLN)", now U.S. Pat. No. 7,233,619, which hereby is incorporated by reference.

This application, application Ser. No. 11/638,989, application Ser. No. 09/467,721 claim priority under 35 U.S.C. §119(e) of U.S. provisional application 60/113,051, filed on Dec. 21, 1998, and entitled "METHODS OF ZERO LOSS (ZL) COMPRESSION AND ENCODING OF GRAYSCALE IMAGES", which hereby is incorporated by reference.

A continuation in part of application Ser. No. 09/467,721, filed Oct. 27, 2005, entitled "HANDHELD VIDEO TRANSMISSION AND DISPLAY," application Ser. No. 11/262,106, was published as U.S. publication 2006/0114987.

A continuation in part of application Ser. No. 11/262,106, filed Jun. 27, 2007, entitled "HANDHELD VIDEO TRANSMISSION AND DISPLAY," application Ser. No. 11/823,493, was published as U.S. publication 2007/0247515.

A continuation in part of application Ser. No. 09/467,721, filed Jun. 18, 2007, entitled "SEPARATE PLANE COMPRESSION USING A PLURALITY OF COMPRESSION METHODS INCLUDING ZLN AND ZLD METHODS," application Ser. No. 11/820,300, docket ZLN3.

My U.S. patent application Ser. No. 09/470,566, filed on Dec. 22, 1999, and entitled GENERAL PURPOSE COMPRESSION FOR VIDEO IMAGES (RHN)", known as the "RHN" method, now U.S. Pat. No. 7,016,417, hereby is incorporated by reference. The RHN application claims a priority date based on a U.S. provisional application 60/113,276 filed on Dec. 23, 1998, which also hereby is incorporated by reference.

The parent application Ser. No. 11/638,989 included by reference application Ser. No. 09/473,190, filed on Dec. 20, 1999, entitled "ADDING DOPPLER ENHANCEMENT TO GRAYSCALE COMPRESSION (ZLD)." Co-pending application Ser. No. 11/820,300, (ZLN3) also includes and claims subject matter from application Ser. No. 09/473,190. Application Ser. No. 09/473,190 hereby is included by reference. Application Ser. No. 09/473,190 claims priority based on provisional application 60/113,050 filed on Dec. 21, 1998 and entitled "METHODS OF ADDING DOPPLER ENHANCEMENT TO GRAYSCALE COMPRESSION (ZLD)," which is hereby incorporated by reference.

This application, application Ser. No. 11/820,300 (ZLN3), and application Ser. No. 09/473,190 claim priority under 35 U.S.C. §119(e) of the U.S. provisional application 60/113,050 filed on Dec. 21, 1998

My U.S. patent application Ser. No. 09/312,922, filed on May 17, 1999, entitled "SYSTEM FOR TRANSMITTING VIDEO IMAGES OVER A COMPUTER NETWORK TO A REMOTE RECEIVER," now U.S. Pat. No. 7,257,158, describes an embodiment of the invention of the RHN method, as well as a system for practicing the compression method, and also hereby is incorporated by reference.

U.S. patent application Ser. No. 09/436,432, filed on Nov. 8, 1999, and entitled "SYSTEM FOR TRANSMITTING VIDEO IMAGES OVER A COMPUTER NETWORK TO A REMOTE RECEIVER," now U.S. Pat. No. 7,191,462, is wholly owned by the inventor of the present invention.

ZLN is a three-letter identifier used to refer to the family of compression methods disclosed in the ZLN application. ZLD is a three-letter identifier used to refer to the family of compressions methods disclosed herein. ZL originally stood for ZeroLoss, a trademark of Kendyl Roman referring to the clinically lossless nature of the methods. The N in ZLN refers to the variable nature of the method when N can be one of a plurality of values. The D in ZLD refers to the added capabilities for handling Doppler enhanced images in conjunction with a compression method such as one of the ZLN family of methods.

The ZLN and ZLD family of compression methods can be practiced on any number apparatus or medium known in the art, including those disclosed herein, in U.S. provisional application 60/085,818, international application PCT/US99/10894, international publication number WO 99/59472, U.S. application Ser. No. 09/312,922, U.S. Pat. No. 7,257,158, or in U.S. patent application Ser. No. 09/436,432, U.S. Pat. No. 7,191,462.

U.S. patent application Ser. No. 09/433,978, filed on Nov. 4, 1999, and entitled "GRAPHICAL USER INTERFACE INCLUDING ZOOM CONTROL REPRESENTING IMAGE AND MAGNIFICATION OF DISPLAYED IMAGE", now U.S. Pat. No. 6,803,931, is wholly owned by the inventor of the present invention.

BACKGROUND

1. Field of the Invention

This invention relates to data compression, specifically to the compression and decompression of video images.

The ZLD format relates specifically to the compression and decompression of video images that contain an image overlaid with Doppler enhancement.

2. Description of Prior Art

In the last few years, there have been tremendous advances in the speed of computer processors and in the availability of bandwidth of worldwide computer networks such as the Internet. These advances have led to a point where businesses and households now commonly have both the computing power and network connectivity necessary to have point-to-point digital communications of audio, rich graphical images, and video. However the transmission of video signals with the full resolution and quality of television is still out of reach. In order to achieve an acceptable level of video quality, the video signal must be compressed significantly without losing either spatial or temporal quality.

A number of different approaches have been taken but each has resulted in less than acceptable results. These approaches and their disadvantages are disclosed by Mark Nelson in a book entitled The Data Compression Book, Second Edition, published by M&T Book in 1996. Mark Morrision also discusses the state of the art in a book entitled The Magic of Image Processing, published by Sams Publishing in 1993.

Video Signals

Standard video signals are analog in nature. In the United States, television signals contain 525 scan lines of which 480 lines are visible on most televisions. The video signal represents a continuous stream of still images, also known as frames, which are fully scanned, transmitted and displayed at a rate of 30 frames per second. This frame rate is considered full motion.

A television screen has a 4:3 aspect ratio.

When an analog video signal is digitized, each of the 480 lines is sampled 640 times, and each sample is represented by a number. Each sample point is called a picture element, or pixel. A two dimensional array is created that is 640 pixels wide and 480 pixels high. This 640×480 pixel array is a still graphical image that is considered to be full frame. The human eye can perceive 16.7 thousand colors. A pixel value comprised of 24 bits can represent each perceivable color. A graphical image made up of 24-bit pixels is considered to be full color. A single, second-long, full frame, full color video requires over 220 millions bits of data.

The transmission of 640×480 pixels×24 bits per pixel times 30 frames requires the transmission of 221,184,000 million bits per second. A T1 Internet connection can transfer up to 1.54 million bits per second. A high-speed (56 Kb) modem can transfer data at a maximum rate of 56 thousand bits per second. The transfer of full motion, full frame, full color digital video over a T1 Internet connection, or 56 Kb modem, will require an effective data compression of over 144:1, or 3949:1, respectively.

A video signal typically will contain some signal noise. In the case where the image is generated based on sampled data, such as an ultrasound machine, there is often noise and artificial spikes in the signal. A video signal recorded on magnetic tape may have fluctuations due the irregularities in the recording media. Florescent or improper lighting may cause a solid background to flicker or appear grainy. Such noise exists in the real world but may reduce the quality of the perceived image and lower the compression ratio that could be achieved by conventional methods.

Basic Run-length Encoding

An early technique for data compression is run-length encoding where a repeated series of items are replaced with one sample item and a count for the number of times the sample repeats. Prior art shows run-length encoding of both individual bits and bytes. These simple approaches by themselves have failed to achieve the necessary compression ratios.

Variable Length Encoding

In the late 1940s, Claude Shannon at Bell Labs and R. M. Fano at MIT pioneered the field of data compression. Their work resulted in a technique of using variable length codes where codes with low probabilities have more bits, and codes with higher probabilities have fewer bits. This approach requires multiple passes through the data to determine code probability and then to encode the data. This approach also has failed to achieve the necessary compression ratios.

D. A. Huffman disclosed a more efficient approach of variable length encoding known as Huffman coding in a paper entitled "A Method for Construction of Minimum Redundancy Codes," published in 1952. This approach also has failed to achieve the necessary compression ratios.

Arithmetic, Finite Context, and Adaptive Coding

In the 1980s, arithmetic, finite coding, and adaptive coding have provided a slight improvement over the earlier methods. These approaches require extensive computer processing and have failed to achieve the necessary compression ratios.

Dictionary-Based Compression

Dictionary-based compression uses a completely different method to compress data. Variable length strings of symbols are encoded as single tokens. The tokens form an index to a dictionary. In 1977, Abraham Lempel and Jacob Ziv published a paper entitled, "A Universal Algorithm for Sequential Data Compression" in IEEE Transactions on Information Theory, which disclosed a compression technique commonly known as LZ77. The same authors published a 1978 sequel entitled, "Compression of Individual Sequences via Variable-Rate Coding," which disclosed a compression technique commonly known as LZ78 (see U.S. Pat. No. 4,464,650). Terry Welch published an article entitled, "A Technique for High-Performance Data Compression," in the June 1984 issue of IEEE Computer, which disclosed an algorithm commonly known as LZW, which is the basis for the GIF algorithm (see U.S. Pat. Nos. 4,558,302, 4,814,746, and 4,876, 541). In 1989, Stack Electronics implemented a LZ77 based method called QIC-122 (see U.S. Pat. No. 5,532,694, U.S. Pat. No. 5,506,580, and U.S. Pat. No. 5,463,390).

These lossless (method where no data is lost) compression methods can achieve up to 10:1 compression ratios on graphic images typical of a video image. While these dictionary-based algorithms are popular, these approaches require extensive computer processing and have failed to achieve the necessary compression ratios.

JPEG and MPEG

Graphical images have an advantage over conventional computer data files: they can be slightly modified during the compression/decompression cycle without affecting the perceived quality on the part of the viewer. By allowing some loss of data, compression ratios of 25:1 have been achieved without major degradation of the perceived image. The Joint Photographic Experts Group (JPEG) has developed a standard for graphical image compression. The JPEG lossy (method where some data is lost) compression algorithm first divides the color image into three color planes and divides each plane into 8 by 8 blocks, and then the algorithm operates in three successive stages:

(a) A mathematical transformation known as Discrete Cosine Transform (DCT) takes a set of points from the spatial domain and transforms them into an identical representation in the frequency domain.

(b) A lossy quantization is performed using a quantization matrix to reduce the precision of the coefficients.

(c) The zero values are encoded in a zig-zag sequence (see Nelson, pp. 341-342).

JPEG can be scaled to achieve higher compression ratios by allowing more loss in the quantization stage of the compression. However this loss results in certain blocks of the image being compressed such that areas of the image have a blocky appearance and the edges of the 8 by 8 blocks become apparent because they no longer match the colors of their adjacent blocks. Another disadvantage of JPEG is smearing. The true edges in an image get blurred due to the lossy compression method.

The Moving Pictures Expert Group (MPEG) uses a combination of JPEG based techniques combined with forward and reverse temporal differencing. MPEG compares adjacent frames and, for those blocks that are identical to those in a previous or subsequent frame, only a description of the previous or subsequent identical block is encoded. MPEG suffers from the same blocking and smearing problems as JPEG.

These approaches require extensive computer processing and have failed to achieve the necessary compression ratios without unacceptable loss of image quality and artificially induced distortion.

QuickTime: CinePak, Sorensen, H.263

Apple Computer, Inc. released a component architecture for digital video compression and decompression, named QuickTime. Any number of methods can be encoded into a QuickTime compressor/decompressor (codec). Some popular codecs are CinePak, Sorensen, and H.263. CinePak and Sorensen both require extensive computer processing to prepare a digital video sequence for playback in real time; neither can be used for live compression. H.263 compresses in real time but does so by sacrificing image quality resulting in severe blocking and smearing.

Fractal and Wavelet Compression

Extremely high compression ratios are achievable with fractal and wavelet compression algorithms. These approaches require extensive computer processing and generally cannot be completed in real time.

Sub-Sampling

Sub-sampling is the selection of a subset of data from a larger set of data. For example, when every other pixel of every other row of a video image is selected, the resulting image has half the width and half the height. This is image sub-sampling. Other types of sub-sampling include frame sub-sampling, area sub-sampling, and bit-wise sub-sampling.

Image Stretching

If an image is to be enlarged but maintain the same number of pixels per inch, data must be filled in for the new pixels that are added. Various methods of stretching an image and filling in the new pixels to maintain image consistency are known in the art. Some methods known in the art are dithering (using adjacent colors that appear to be blended color), and error diffusion, "nearest neighbor", bilinear and bicubic.

Doppler Enhancement

Doppler techniques are used to determine the velocities of one or more small objects. Some common uses of Doppler techniques include without limitation:

1. Radar used to detect rain
2. Radar used to determine speed of vehicles or aircraft
3. Ultrasound blood flow analysis Doppler velocity scales are often incorporated with grayscale images.

In the case of ultrasound blood flow analysis, average velocities toward the sensing probe are encoded as a shade of red and velocities away from the sensing probe are encoded as a shade of blue. Although the image appears to be in color, there are really three monochromic values: a grayscale, a red scale, and a blue scale. The base image plane (grayscale ultrasound) is generated more often (typically 15-30 frames per second) than the overlay plane showing the Doppler red and blue scales (typically 3-10 frames per second).

In the case of rain, the base map of the earth is generated only once and the Doppler colors that indicate the intensity of the precipitation are laid over the base map.

Moving Pictures

A video or movie is comprised of a series of still images that, when displayed in sequence, appear to the human eye as a live motion image. Each still image is called a frame. Television in the USA displays frames at the rate of 30 frames per second. Theater motion pictures are displayed at 24 frames per second. Cartoon animation is typically displayed at 8-12 frames per second.

Compression Methods

The ZLN and ZLD methods are effective ways to compress video images. Other compression algorithms are known in the prior art, including RLE, GIF (LZW), MPEG, Cinepak, Motion-JPEG, Sorensen, Fractal, and many others.

Each of these methods treats a frame of video as a basic unit of compression applying the compression method uniformly to the entire image.

Color Plane Separation

It is well known in the art that an image can be uniformly separated into color planes based on the red, green, and blue components values for each pixel, based on hue, saturation, and brightness component values for each pixel, or based on ink colors, such as cyan, yellow, magenta, and black. However these color plane separations are not done to reduce data size or to aid compression. They are used to facilitate the display (such as on a RGB or YUV computer monitor) or the printing of the image (for example, four-color printing).

Frame Differencing

MPEG and some other compression methods compare adjacent frames in a stream of frames. Under certain circumstances these methods send only a subset of a frame (namely a rectangular portion that contains a change when compared to the adjacent frame) which is then overlaid on the unchanged data for the adjacent frame.

SUMMARY OF THE INVENTION

In accordance with the present invention a method of compression of a video stream comprises steps of sub-sampling a video frame, and run-length encoding the sub-sampled pixel values, whereby the method can be executed in real time and the compressed representation of pixels saves substantial space on a storage medium and requires substantially less time and bandwidth to be transported over a communications link. The present invention includes a corresponding method for decompressing the encoded data.

Doppler velocity scales are incorporated into grayscale compression methods using two bits.

In accordance with an aspect of the present invention, a method of adding Doppler enhancement to compression code typically formatted for grayscale only, by using two bits of the data field to represent the scale of the remaining bits where said bits indicate one of the set of scales comprising:

1. grayscale,
2. red scale, and
3. blue scale.

Objects and Advantages

Accordingly, beside the objects and advantages of the method described above, some additional objects and advantages of the present invention are:

(a) to provide a method of compressing and decompressing video signals so that the video information can be transported across a digital communications channel in real time.

(b) to provide a method of compressing and decompressing video signals such that compression can be accomplished with software on commercially available computers without the need for additional hardware for either compression or decompression.

(c) to provide a high quality video image without the blocking and smearing defects associated with prior art lossy methods.

(d) to provide a high quality video image that suitable for use in medical applications.

(e) to enhance images by filtering noise or recording artifacts.

(f) to provide a method of compression of video signals such that the compressed representation of the video signals is substantially reduced in size for storage on a storage medium.

(g) to provide a level of encryption so that images are not directly viewable from the data as contained in the transmission.

(h) to provide efficient encoding of Doppler enhanced images.

(i) to reduce the size of an encoded data buffer that contains Doppler enhancement.

(j) to provide efficient encoding for video images that contain distinguishable regions.
(k) to reduce the size of an encoded data representing a video stream.
(l) to reduce the bandwidth required to transmit an encoded video stream.
(m) to provide user control of compression methods.

DRAWING FIGURES

In the drawings, closely related figures have the same number but different alphabetic suffixes.

FIG. 2A to 2H show alternatives for selecting a pixel value for encoding.

FIG. 2A shows the four channel format of a pixel.

FIG. 2B shows the three color components of a pixel.

FIG. 2G shows selection of a component of a grayscale pixel.

FIG. 2F shows a selection of the red component of a red scale pixel.

FIG. 11A shows an example encode table.

FIG. 11B shows a corresponding grayscale decode table.

FIG. 11C shows a corresponding red scale decode table.

FIGS. 14A through 14C shows embodiments of a machine element for variably altering the number of bits.

Figure 1:
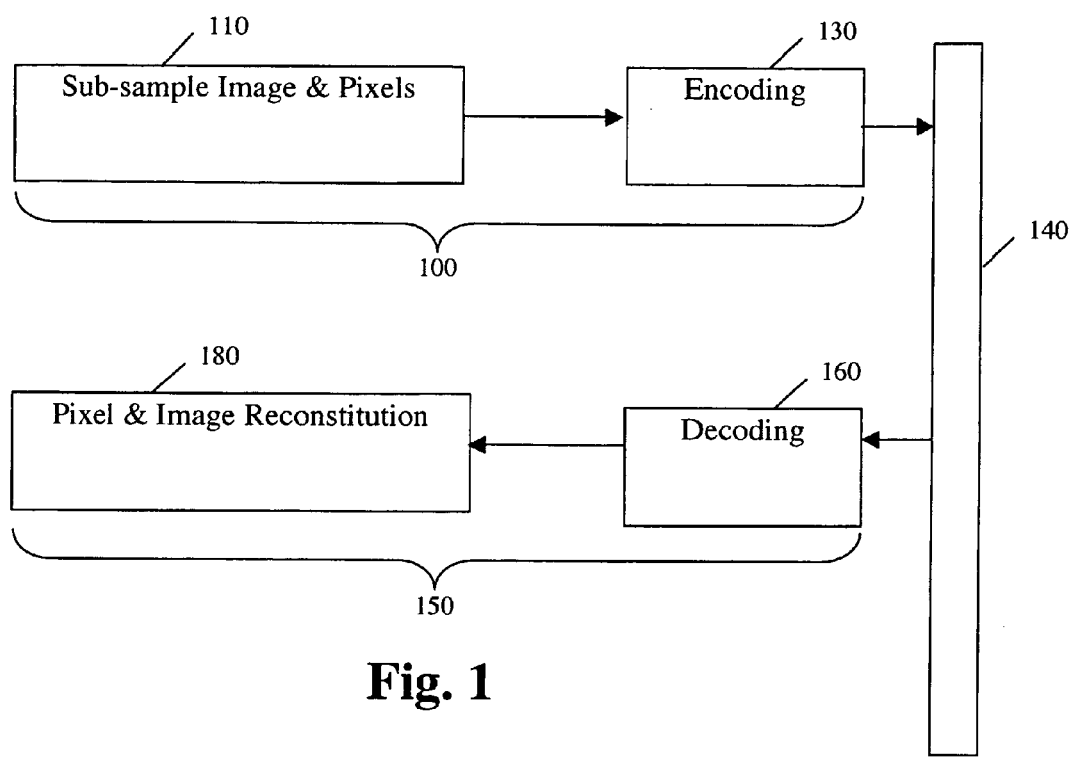
FIG. 1 shows the high level steps of compression and decompression of an image.

| Reference Numerals in Drawings | |
|---|---|
| 100 | compression steps |
| 110 | sub-sampling step |
| 130 | encoding step |
| 140 | encoded data |
| 150 | decompression steps |
| 160 | decoding step |
| 180 | image reconstitution step |
| 200 | 32 bit pixel value (four channel format) |
| 202 | blue channel |
| 204 | green channel |
| 206 | red channel |
| 208 | alpha channel |
| 210 | 24 bit pixel value |
| 212 | blue component |
| 214 | green component |
| 216 | red component |
| 220 | RGB averaging diagram |
| 222 | blue value |
| 224 | green value |
| 226 | red value |
| 228 | averaged value |
| 230 | blue selection diagram |
| 232 | blue instance |
| 234 | green instance |
| 236 | red instance |
| 240 | selected blue value |
| 250 | green selection diagram |
| 260 | selected green value |
| 270 | red selection diagram |
| 280 | selected red value |
| 290 | grayscale pixel |
| 292 | grayscale blue |
| 294 | grayscale green |
| 296 | grayscale red |
| 298 | selected grayscale value |
| 299 | filtered pixel value |
| 300 | N |
| 301 | U |
| 302 | W |
| 310 | pixel bit 7 |
| 312 | pixel bit 6 |
| 314 | pixel bit 5 |
| 316 | pixel bit 4 |
| 318 | pixel bit 3 |
| 320 | pixel bit 2 |
| 322 | pixel bit 1 |
| 324 | pixel bit 0 |
| 325 | 8 bit pixel |
| 330 | 5 bit sample |
| 332 | sample bit 4 |
| 334 | sample bit 3 |
| 336 | sample bit 2 |
| 338 | sample bit 1 |
| 340 | sample bit 0 |
| 350 | 3 low order bits |
| 360 | formatted code |
| 362 | encoded bit 4 |
| 364 | encoded bit 3 |
| 366 | encoded bit 2 |
| 368 | encoded bit 1 |
| 370 | encoded bit 0 |
| 380 | 3 bit count value |
| 400 | encode flowchart |
| 402 | encode entry |
| 403 | encode initialization step |
| 404 | get pixel step |
| 405 | get value step |
| 406 | lookup encoded value step |
| 408 | compare previous |
| 410 | increment counter step |
| 412 | check count overflow |
| 414 | new code step |
| 416 | check end of data |

-continued

| | Reference Numerals in Drawings |
|---|---|
| 418 | set done |
| 420 | counter overflow step |
| 422 | check done |
| 428 | encode exit |
| 430 | image |
| 440 | image width |
| 450 | image height |
| 460 | pixel stream |
| 500 | code byte |
| 501 | S1 |
| 502 | S0 |
| 503 | S |
| 505 | E |
| 510 | flag bit |
| 511 | Doppler/grayscale flag zero |
| 512 | don't care |
| 514 | grayscale value |
| 515 | grayscale code |
| 520 | repeat code |
| 521 | Doppler/grayscale flag one |
| 522 | blue/red flag zero |
| 524 | red scale value |
| 525 | red Doppler scale code |
| 530 | count |
| 531 | second Doppler/grayscale flag one |
| 532 | blue/red flag one |
| 534 | blue scale value |
| 535 | blue Doppler scale code |
| 541 | second Doppler/grayscale flag zero |
| 544 | extended value |
| 545 | extended grayscale code |
| 550 | data code |
| 551 | S1 in ZLN format |
| 552 | S0 in ZLN format |
| 553 | S in ZLN format |
| 554 | E in ZLN format |
| 555 | C |
| 557 | X |
| 560 | wasted bits |
| 565 | data bit 6 |
| 570 | data bit 5 |
| 575 | data bit 4 |
| 580 | data bit 3 |
| 585 | data bit 2 |
| 590 | data bit 1 |
| 595 | data bit 0 |
| 610 | decimal values |
| 620 | first value |
| 622 | second value |
| 624 | third value |
| 626 | fourth value |
| 628 | fifth value |
| 630 | sixth value |
| 632 | seventh value |
| 640 | binary code |
| 650 | first byte |
| 651 | first data |
| 652 | first count |
| 653 | second byte |
| 654 | second data |
| 655 | second count |
| 656 | third byte |
| 657 | third data |
| 658 | third count |
| 740 | RHN binary code |
| 803 | ZL3 format |
| 804 | ZL4 format |
| 805 | ZL5 format |
| 808 | ZL8 format |
| 809 | ZL9 format |
| 812 | ZL12 format |
| 820 | ZL9C format |
| 900 | decode entry |
| 901 | decode initialize step |
| 902 | get code step |
| 908 | decode lookup step |
| 909 | check zero count |
| 910 | place pixel step |

-continued

| | Reference Numerals in Drawings |
|---|---|
| 914 | reset counter step |
| 916 | check length |
| 918 | decode exit |
| 920 | decode flowchart |
| 1010 | first adjacent pixel |
| 1012 | second adjacent pixel |
| 1014 | first subsequent adjacent pixel |
| 1016 | second subsequent adjacent pixel |
| 1052 | interpolated pixel |
| 1054 | interpolated pixel |
| 1056 | interpolated pixel |
| 1058 | interpolated pixel |
| 1060 | interpolated pixel |
| 1100 | encryption table |
| 1110 | decryption table |
| 1112 | grayscale red bits |
| 1114 | grayscale green bits |
| 1116 | grayscale blue bits |
| 1120 | red scale decode table |
| 1122 | red scale red bits |
| 1124 | red scale green bits |
| 1126 | red scale blue bits |
| 1200 | video frames |
| 1205a | first video frame |
| 1205b | second video frame |
| 1205n | nth video frame |
| 1210 | compressor |
| 1215 | video signal |
| 1220 | series of encoded data |
| 1225a | first encoded data |
| 1225b | second encoded data |
| 1225n | nth encoded data |
| 1225 | encoded data buffer |
| 1230a | first received encoded data |
| 1230b | second received encoded data |
| 1230n | nth received encoded data |
| 1230 | received encoded data |
| 1235 | encoded data stream |
| 1238 | received encoded data (series) |
| 1240 | I/O device |
| 1245 | input encoded data stream |
| 1250 | decompressor |
| 1260a | first decoded video frame |
| 1260b | second decoded video frame |
| 1260n | nth decoded video frame |
| 1260 | decoded video frame |
| 1268 | decoded video frames |
| 1270 | video sequence |
| 1280 | storage medium |
| 1290 | communications channel |
| 1310 | video digitizer |
| 1320 | path 1320 |
| 1330 | video memory |
| 1331 | scan |
| 1332 | pixel index |
| 1340 | path 1340 |
| 1350 | encoding circuit |
| 1360 | path 1360 |
| 1370 | encoded data |
| 1380a | 24 to 5 bit sub-sampler |
| 1380b | 24-bit RGB to 5 bit sub-sampler |
| 1380c | 32-bit RGB to 5 bit sub-sampler |
| 1380d | color 9-bit sub-sampler |
| 1380e | YUV sub-sampler |
| 1380f | 36-bit RGB to 24-bit sub-sampler |
| 1380g | 15-bit sub-sampler |
| 1380 | pixel sub-sampler |
| 1382 | pixel extractor |
| 1383 | value path |
| 1384 | coder |
| 1385 | path 1385 |
| 1390 | data/count |
| 1392 | code index |
| 1395 | path 1395 |
| 1400 | 24-bit to variable bit sub-sampler |
| 1401 | generic 3-bit sub-sampler |
| 1402 | generic 4-bit sub-sampler |
| 1403 | generic 8-bit sub-sampler |

-continued

| Reference Numerals in Drawings | |
|---|---|
| 1404 | generic 10-bit sub-sampler |
| 1410 | number of bits selector |
| 1420 | number of bits indicator |
| 1430 | 36-bit to variable bit sub-sampler |
| 1440 | 24/36 bit variable bit sub-sampler |
| 1450 | second selector |
| 1460 | selection logic |
| 1470 | selection signal |
| 1510 | decoding circuit |
| 1520 | decoded pixel values |
| 1530 | decoder pixel index |
| 1540 | image memory |
| 1600 | transmitter |
| 1610 | receiver |
| 1615 | setting control path |
| 1620 | frame sub-sampler |
| 1621 | path 1621 |
| 1630 | selected frame |
| 1632 | pixel from frame |
| 1640 | transmitter pixel sub-sampler |
| 1642 | path 1642 |
| 1650 | run length encoder |
| 1660 | settings |
| 1661 | brightness |
| 1662 | contrast |
| 1663 | height |
| 1664 | width |
| 1665 | frame rate |
| 1670 | frame selector |
| 1675 | frame select indicator |
| 1680 | number of pixel bits setting |
| 1690 | alternate transmitter |
| 1700 | run-length encoding step |
| 1710 | run-length encoded output |
| 1720 | further lossless compression step |
| 1730 | further lossless compression output |
| 1800 | unstretched frame |
| 1810 | enlarged image |
| 1820 | stretching step |

DETAILED DESCRIPTION OF THE INVENTION

FIG. 1

Compression and Decompression Steps

FIG. 1 illustrates a sequence of compression steps 100 and a sequence of decompression steps 150 of the present invention. The compression steps 100 comprise a sub-sampling step 110 and an encoding step 130. After completion of the compression steps 100, a stream of encoded data 140 is output to either a storage medium or a transmission channel. The decompression steps 150 comprise a decoding step 160 wherein the stream of encoded data 140 is processed and an image reconstitution step 180.

FIGS. 2A to 2H

Selecting Pixel Values for Encoding

FIGS. 2A to 2G illustrate alternatives for selecting a pixel value for encoding. The sub-sampling step 110 (FIG. 1) includes sub-sampling of a pixel value to obtain a variable selected number of bits.

Video digitizing hardware typical has the options of storing the pixel values as a 32 bit pixel value 200 or a 24 bit pixel value 210, shown in FIG. 2A and FIG. 2B, respectively. The 32 bit pixel value 200 is composed of a blue channel 202, a green channel 204, a red channel 206, and an alpha channel 208. Each channel contains 8 bits and can represent 256 saturation levels for the particular color channel. For each channel the saturation intensity value of zero represents the fully off state, and the saturation intensity value of "255" represents the fully on state. A common alternative not shown is a sixteen-bit format where the three color channels contain 5 bits each and the alpha channel is a single bit. The present invention anticipates the use of the color channels of 16 bit pixel value is a manner substantially the same as the 32-bit pixel value 200 except the number of bits per channel is 5 instead of 8.

The 24-bit pixel value 210 is composed of a blue component 212, a green component 214, and a red component 216. There is no component for the alpha channel in the 24 bit pixel value 210. Regardless of the structure, the blue channel 202 is equivalent to the blue component 212, the green channel 204 is equivalent to the green component 214, and the red channel 206 is equivalent to the red component 216.

In the present invention, the 32 bit pixel value 200 alternative is preferred due to the consistent alignment of 32 bit values in most computer memories; however for simplicity of illustration the alpha channel 208 will be omitted in FIGS. 2C to 2G.

If the video signal is digitized in color, the three color components may have different values. For example in FIG. 2C, a RGB averaging diagram 220 illustrates a blue value 222 of 35 decimal, a green value 224 of 15, and a red value 226 of 10. One alternative is to sub sample from 24 bits to 8 bits by averaging the three color values to obtain an averaged value 228 that, in this example, has the value of 20: (10+15+35)/3=20. This will produce a grayscale image. Alternatively, a color image can be preserved by sampling bits from each color component (see FIG. 8B).

FIG. 2D illustrates another alternative for selecting an 8 bit value in a blue selection diagram 230. In this example, a blue instance 232 has the value of 35, a green instance 234 has the value of 15, and a red instance 236 has the value of 10. In this alternative the blue instance 232 is always selected as a selected blue value 240.

FIG. 2E illustrates another alternative for selecting an 8 bit value in a green selection diagram 250. In this alternative the green instance 234 is always selected as a selected green value 260.

FIG. 2F illustrates another alternative for selecting an 8 bit value in a red selection diagram 270. In this alternative the red instance 236 is always selected as a selected red value 280.

If the video signal being digitized is grayscale, the three color components will have the same values. For example in FIG. 2G, a grayscale pixel 290 comprises a grayscale blue 292 with a value of decimal 40, a grayscale green 294 with a value of 40, and a grayscale red 296 with a value of 40. Because the values are all the same, it makes no difference which grayscale color component is selected, a selected grayscale value 298 will have the value of 40 in this example.

The preferred embodiment of this invention uses the low order byte of the pixel value, which is typically the blue component as shown in FIG. 2D.

FIG. 2H illustrates a filtered pixel value 299 of 8 bits that may be selected by one of the alternatives described above. In these examples, the filtered pixel value 299 is equivalent to items referenced by numerals 228, 240, 260, 280, or 298. This reduction of the 32 bit pixel value 200 or the 24 bit pixel value 210 contributes a reduction in data size of 4:1 or 3:1, respectively. This reduction recognizes that for some images, such as medical images or grayscale images, no relevant information is lost.

For additional compression, the filtered pixel value 299 can variably select any number of bits. For example, selection of the most significant four bits instead of all eight bits filters noise that may show up in the low order bits may be very suitable for an image such as one produced by an ultrasound medical device. An example of this is shown by ZL4 804 in FIG. 8A.

Figure 3A:
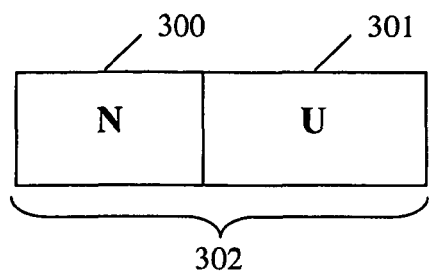
FIG. 3A shows the basic format of the ZLN variable encoding format
Figure 3B:
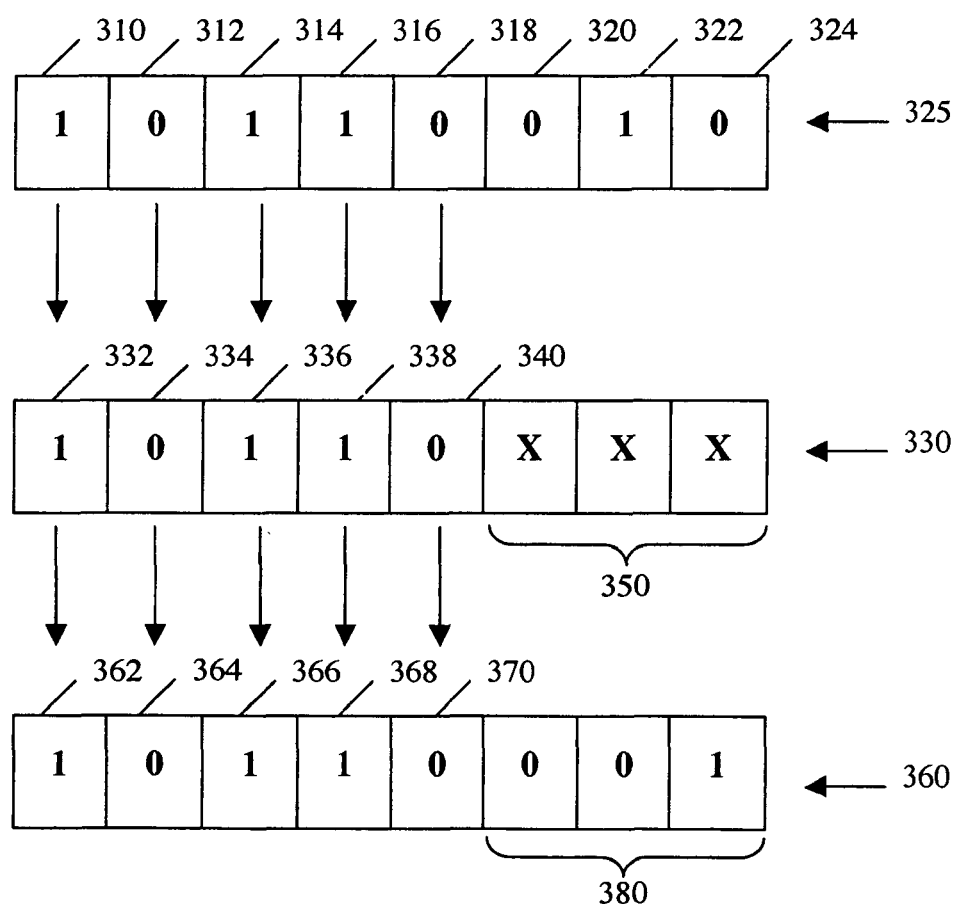
FIG. 3B shows an example of a code where N is 5 bits wide and U is 3 bits wide.

FIGS. 3A and 3B

Encoding Formats

Speed of compression and decompression may be enhanced if the algorithms fit into computer memory native storage elements such as 8 bit bytes, 16 bit words, or 32 bit double words, or some other size for which the computer architecture is optimized.

A grayscale image may be stored at a higher bit level than the actual values require. This may occur when an image is generated by an imaging technology such as radar, ultrasound, x-ray, magnetic resonance, or similar electronic technology. For example an ultrasound machine may only produce 16 levels of grayscale, requiring 4 bits of data per pixel, but the image digitizing may be performed at 8 to 12 bits per pixel. In this example, the low order bits (4 to 8) respectively provide no significant image data.

In the present invention, a fast and efficient compression and encoding method is implemented by using unused bits to store a repeat count for repeated values.

The most significant N bits of the pixel value are selected where N 300 is the number of significant bits (determined by data analysis or by user selection). If N 300 is less than W 302, where W is a native machine data type such as 8 bit byte, 16 bit word, or 32 bit double word or some other size for which the computer architecture is optimized, then W-N equals the number of unneeded bits, U 300. A repeat count, C, can contain a value from 1 to CMAX where CMAX is 2 to the power of U. For example, if U equals 4, C can be a number from 1 to 16. In practice the maximum value will be encoded as a zero because the high order bit is truncated. In the example, decimal 16 has a binary value "10000" will be stored as "0000".

For example, when W is 8, value pairs for N and U could include without limitation (2,6), (3,5), (4,4), (5,3), and (6,2). When W is 16, value pairs for N and U could include without limitation (2,14), (3,13), (4,12), (5,11), (6,10), (7, 9), (8, 8), (9, 7), (10, 6), (11, 5), (12, 4), (13, 3), and (14, 2). When W is 32, value pairs for N and U could include without limitation all combinations of values pairs for N and U where N+U equals 32 and N>1 and U>1. When W is not a multiple of 8, value pairs for N and U could include without limitation all combinations of values pairs for N and U where N+U equals W and N>1 and U>1.

FIG. 3A shows the encoded format where N 300 represent the N most significant bits of the pixel value 299, U 301 represents the bits that are not used for the data and are used for the repeat count, and W 302 where W is the width of the encoded data and equal to sum of N and U. As stated above W is preferably a native machine element.

FIG. 3B illustrates bit sub-sampling where N's 300 bit width is 5, U's 301 bit width is 3, and W 302 is 8. The high order 5 bits 310-318 of an 8 bit pixel 325 are extracted to form a five bit sample 330. The lower 3 bits of 330 are ignored bits 350. In the formatted code 360, the ignored bits 350 are replaced with the repeat count value 380.
Encoding The most significant N bits of each pixel are selected from the image to obtain value V.

In the encryption embodiment of this invention V may be used to select an encoded value, E, from the encoding table. E is also a N-bit value. The number of elements in the encode table 1100 (FIG. 11, shown as an encryption table), is 2 to the Nth power.

In the other embodiments of this invention V is used as E.

E is saved as the prior value, P. For each subsequent pixel, the encoded value, E, is obtained and compared to the prior value, P. If the prior value, P, is the same as E, then a repeat counter, C, is incremented; otherwise the accumulated repeat count, C, for the prior value, P, is merged with P and placed in an array A that implements the encoded data 140 (FIG. 1) buffer. For example, if W is 8 and N is 4 and C is 10, U is 4, CMAX is 16, and ((P<<U)|C) is the merged value. If the repeat count, C, is greater CMAX, then CMAX is merged with P((P<<U)|CMAX) and placed in the encoded data 140 (FIG. 1) buffer, A. CMAX is subtracted from C and merged values are placed in A until C is less than CMAX. All pixels are processed in this manner until the final value is compressed and encoded. The length, L, of the encoded data 140 (FIG. 1) is also placed in the encoded data 140 buffer.

FIG. 4A

Encode Flowchart

Figure 4A:
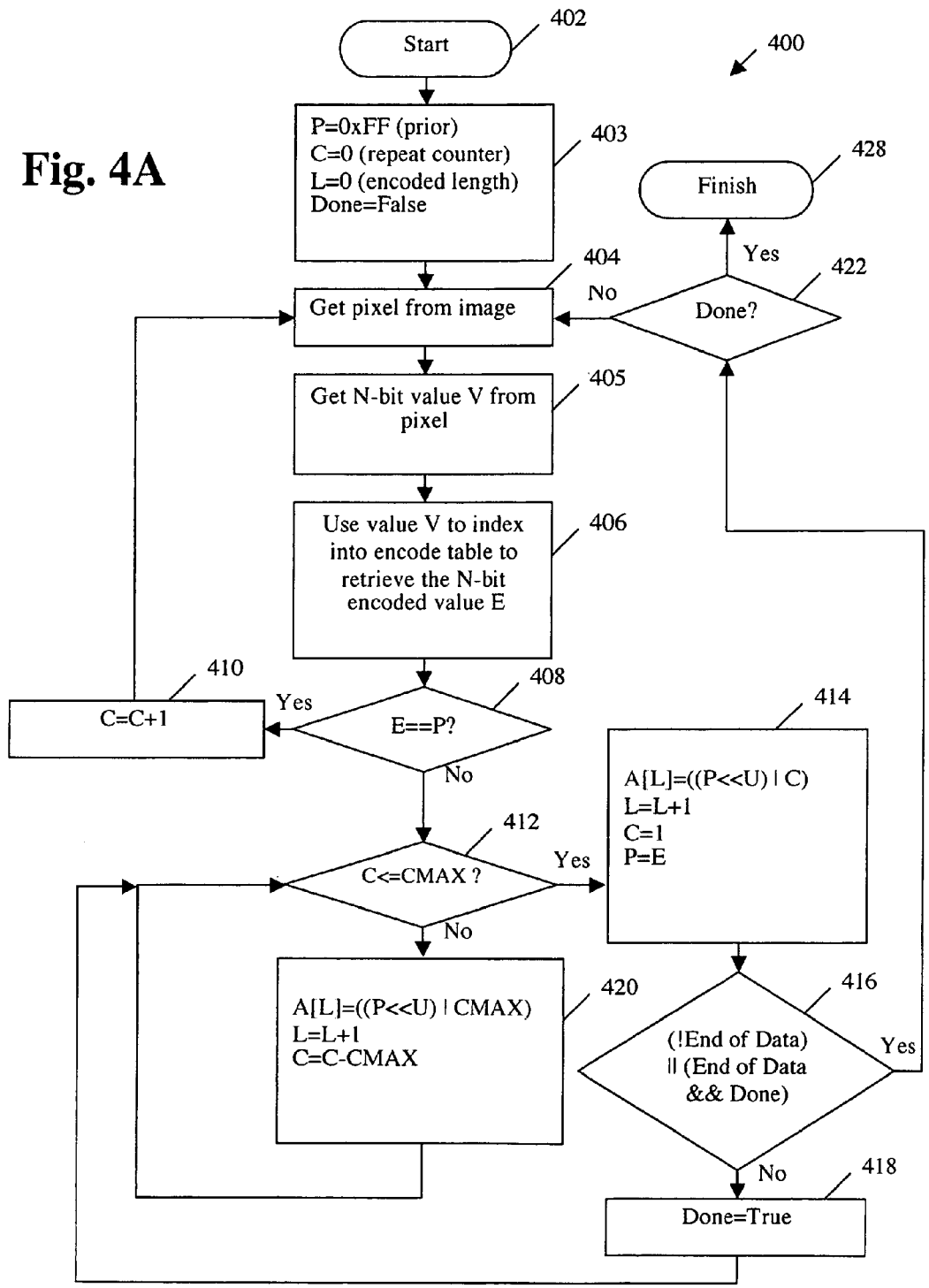
FIG. 4A shows the flowchart for the compression method.

FIG. 4A illustrates the encode flowchart 400 which represents the details of the encryption embodiment of the encoding step 130 (FIG. 1) for the present invention.

The encoding begins at an encode entry 402. In an encode initialization step 403, a prior value P is set to a known value, preferably decimal "255" or hexadecimal 0xFF, a repeat counter C is set to zero, an encoded length L is set to 0, and a completion flag "Done" is set to a logical value of false. Next, a get pixel step 404 obtains a pixel from the image being encoded. At a get value step 405, a value V is set to the N bit filtered pixel value 299 as derived from the pixel using one of the methods shown in FIG. 2C to 2G, preferably the fastest as explained above, and extracting the N most significant bits. At a lookup encoded value step 406, an encoded value E is set to the value of one of the codes 1105 (FIG. 11A) of the encode table 1100 as indexed by V. (In the non-encrypted embodiment of this invention, step 406 is bypassed because V is used as E) Next, a "compare previous" 408 decision is made by comparing the values of E and P. If the values are the same, an increment counter step 410 is executed and flow continues to the get pixel step 404 that obtains the next pixel from the image.

If the encode value E does not match the prior value P, then a check count overflow 412 decision is made. If the counter C is less than or equal to CMAX, then a new code step 414 is executed, otherwise a counter overflow step 420 is executed.

At step 414, the counter C is masked and bit-wise OR-ed with P shifted left by U bit positions and is placed in the A at the next available location as indexed by the encoded length L. Then, continuing inside flowchart step 414, L is incremented, the repeat count C is set to 1 and the prior value P is set to E. After step 414, a "check end of data" decision is made by checking to see if there are any more pixels in the image, and, if not, if the last value has been processed. Because this method utilizes a read ahead technique step 414 must be executed one more time after the end of data is reached to process the last run-length. If there is more data in the image, flow continues to a check of the completion flag "Done" at step 422. If the check indicates that the process is not completed, flow continues to step 404.

If the end of data is reached but the completion flag "Done" is still false, flow continues to a set done step 418. At step 418, the completion flag "Done" is set to logical true, and flow continues to decision 412 where the last run-length will be output and flow will eventually exit through step 414, decision 416, decision 422, and then terminate at encode exit 428.

It is possible for the repeat count C to become larger than CMAX requiring more bits than allocated by this method. This situation is handled by making the "check count overflow" 412 decision and executing the "counter overflow" step 420. At step 420, the counter C is masked and bit-wise OR-ed with P shifted left by U bit positions and is placed in the A at the next available location as indexed by the encoded length L. Then, continuing inside flowchart step 414, L is incremented, and the repeat count C is decrement by CMAX. After step 420, flow continues to the "check count overflow" 412 decision. Thus when the encode value E repeats more than CMAX times, multiple sets of repeat counts and encoded values are output to the encoded data 140 buffer.

This entire process is repeated for each image or video frame selected during optional image sub-sampling (see 110 in FIG. 1) and the encoded length L is transmitted with the encoded data associated with each frame. The encoded length varies from frame to frame depending on the content of the image being encoded.

FIG. 4B

Image and Pixel Stream

Figure 4B:
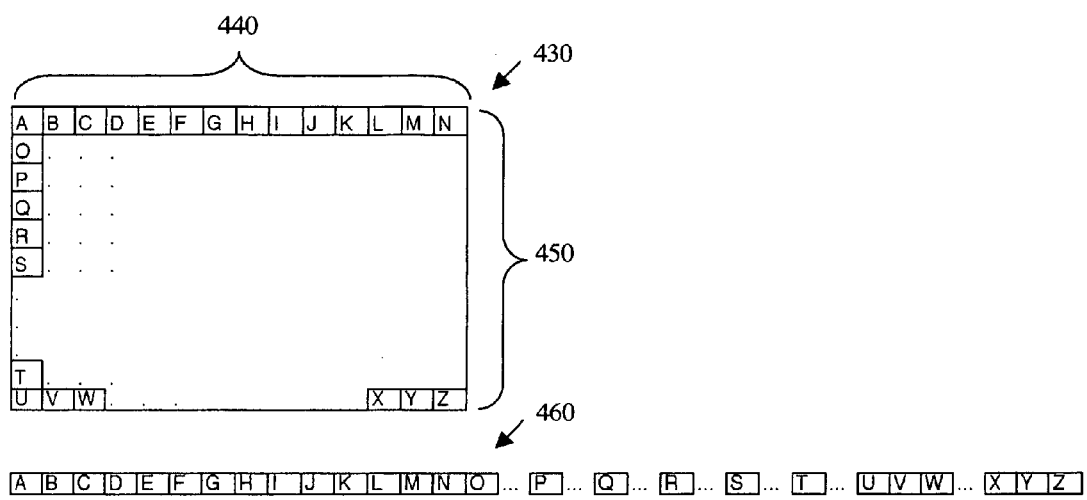
FIG. 4B shows an image and a corresponding stream of pixels.

FIG. 4B illustrates an image and its corresponding stream of pixels. A rectangular image 430 is composed of rows and columns of pixels. The image 430 has a width 440 and a height 450, both measured in pixels. In this illustrative embodiment, pixels in a row are accessed from left to right. Rows are accessed from top to bottom. Some pixels in the image are labeled from A to Z. Pixel A is the first pixel and pixel Z is the last pixel. Scanning left to right and top to bottom will produce a pixel stream 460. In the pixel stream 460, pixels A and B are adjacent. Also pixels N and O are adjacent even though they appear on different rows in the image. If adjacent pixels have the same code the process in FIG. 4A will consider them in the same run.

Because the video signal being digitized is analog there will be some loss of information in the analog to digital conversion. The video digitizing hardware can be configured to sample the analog data into the image 430 with almost any width 440 and any height 450. The present invention achieves most of its effective compression by sub-sampling the data image with the width 440 value less than the conventional 640 and the height 450 value less than the convention 480. In a preferred embodiment of the invention, for use in a medical application with T1 Internet transmission bandwidth, image dimensions are sub-sampled at 320 by 240. However an image dimension sub-sampling resolution of 80 by 60 may be suitable for some video application.

Figure 5A:
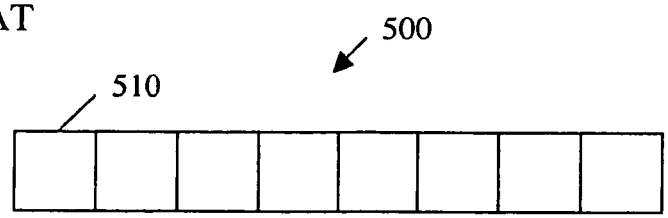
FIG. 5A to 5C shows the formats for the run-length encoding of the RHN method.
Figure 5B:
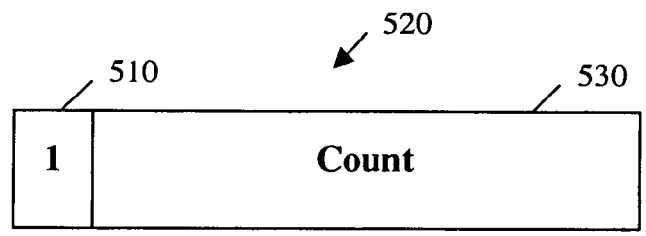
Figure 5C:
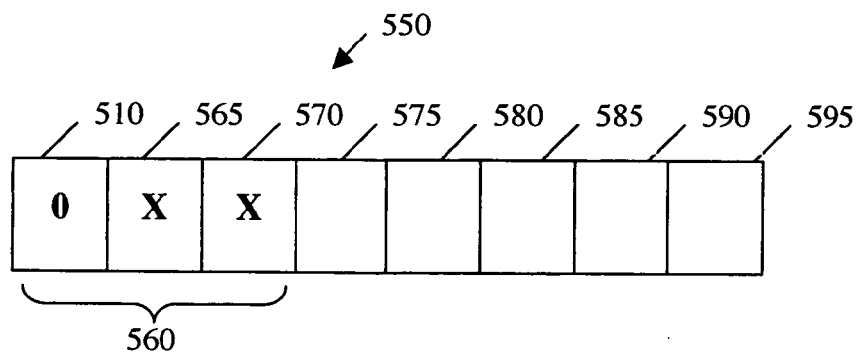

FIGS. 5A to 5C

Run-Length Encoding Formats of the RHN Method

FIGS. 5A to 5C show use of a different structure than the present invention. FIGS. 5A to 5C show the formats for the run-length encoding of RHN. In FIG. 5A, a code byte 500, with its high order bit designated as a flag bit 510.

FIG. 5B shows a repeat code 520 comprising a Boolean value one in its flag bit 510 and a 7 bit count 530 in the remaining 7 low order bits. The seven bit count 530 can represent 128 values with a zero representing "128" and 1 through 127 being their own value.

FIG. 5C shows a data code 550 comprising:
1. a Boolean value zero in its flag bit 510
2. two unused data bits: data bit 6 reference by 565 and data bit 5 reference by 570, and
3. five bits, data bits 4 to 0, reference by 575, 580, 585, 590, and 595, respectively.

FIG. 5C shows that in every byte of the RHN data code 550 two bits are unused and one bit is used for the flag bit, so that only five of the eight bits are used for data. The remaining three bits are wasted bits 560. The present invention uses a different structure by placing the repeat count in bits that the RHN format would not have used for data (U). The corresponding ZLN format, ZL5 (where N is 5, U is 3, and W is 8), always uses five bits for data and the remaining 3 bits for the repeat count. In practice, repeat counts are small and often can fit in 3 bits, so this embodiment of the present invention will result in superior compression performance over the RHN method.

In addition, the present invention provides for a larger count when the bit filtering is larger. For example, the alternate ZLN format where each byte contains 4 data bits, ZL4 (where N is 4 and U is 4), allows for a four bits of repeat count. For example, in practice, ZL4 is superior to RHN on a typical ultrasound image containing 16 shades of gray.

FIGS. 5D to 5G

Doppler Improvement of ZLN Format

The ZLN format for encoding video signals (see for example FIG. 3A) has one disadvantage. When the video stream being compressed changes from only grayscale to grayscale overlaid with Doppler enhancement, the colors of the Doppler red and blue scales are also converted to grayscale. A Doppler improvement aspect of the present invention provides a variable means of encoding the Doppler enhanced image with in the data bits of a ZLN format.

FIG. 3A shows the ZLN format comprising N 300 and U 301 that make up a data element with a bit length of W 302.

The Doppler improvement aspect encodes the Doppler values in the N 300 portion of the ZLN format. However the scope of this invention should not be limited to using this technique with ZLN formats only as other compression formats are anticipated by this invention.

Doppler Encoding Format

The Doppler enhanced grayscale image must be captured as color data (see FIG. 2B). If the red, green, and blue values are the same, then the pixel is gray (e.g. FIG. 2G). If the red, green, and blue values are not equal, then the pixel is representing a red scale or blue scale value (e.g. FIG. 2F). By comparing the values of the red, green, and blue values, a red scale or blue scale value is determined.

Figure 5D:
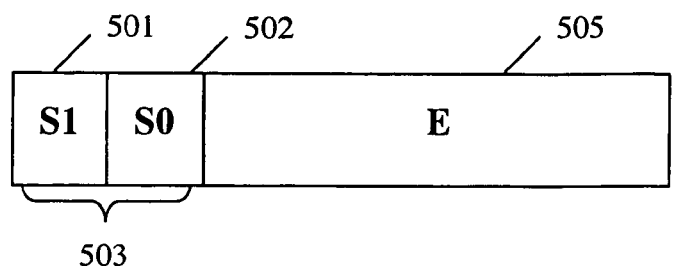
FIG. 5D shows the ZLD format.
Figure 5E:
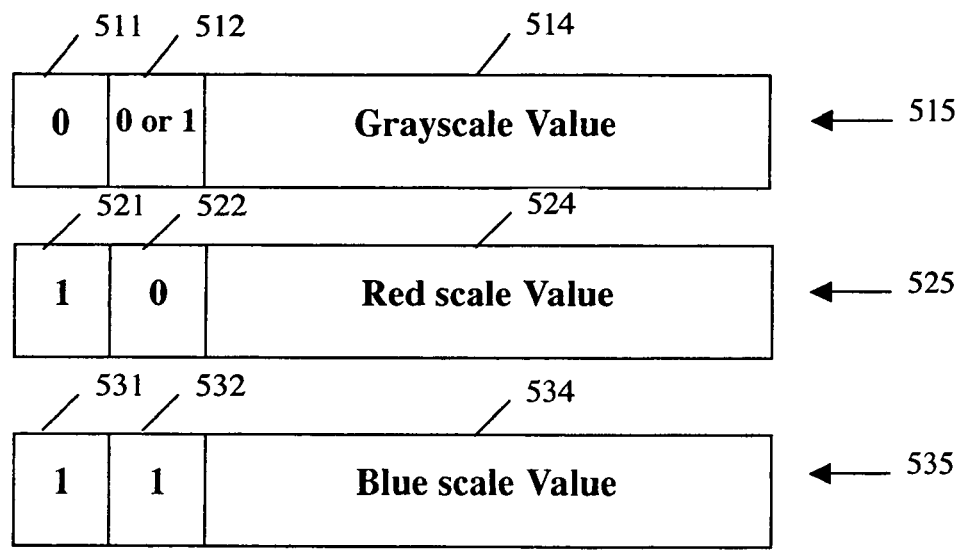
FIG. 5E shows the three formats of the three scales.

In FIG. 5D, two bits, S 503, are used to indicate which scale the pixel is from. The high bit order bit, S1 501, is used to indicate that the value is a gray scale value: zero means grayscale (e.g. 515 in FIG. 5E and 541 in FIG. 5F), one means Doppler (e.g. 525 and 535 in FIG. 5E). The low order bit, S0 502, is used to indicate red scale or blue scale: zero means red scale (e.g. 525 in FIG. 5E), one means blue scale (e.g. 535 in FIG. 5E). In the grayscale code 515, the value of the S0 bit is a don't care 512 and it can be coded as either a zero or a one. In combination with the ZLN format, the remaining bits of W are used for a repeat count, C (FIG. 5G).

An alternate embodiment of this invention uses lookup tables rather selecting the most significant bits. Instead of one encode (e.g. FIG. 11A) and one decode table (e.g. FIG. 11B) as used in ZLN, a set of tables is used for each scale, gray, red, and blue, respectively. FIG. 11C shows an example of a red scale decode table.

Figure 5F:
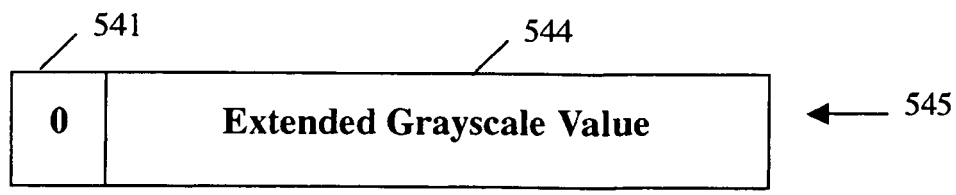
FIG. 5F shows an alternate embodiment of the grayscale format.
Figure 5G:
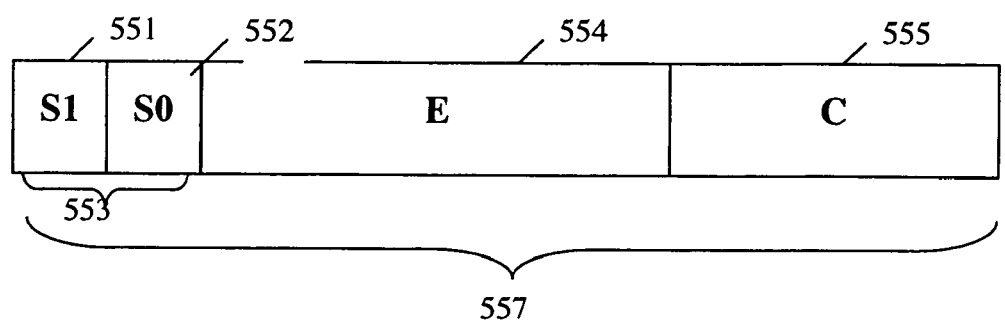
FIG. 5G shows the ZLD format embedded in the ZLN format.

In an alternate embodiment, S0 is used as an additional bit of grayscale resolution since S0 502 is not used in the grayscale case 545 (FIG. 5F).

In a method where W is the number of bits in a native machine data type, and N is the number of significant grayscale bits, two bits, S 503, are used to indicate which scale the pixel is from. The high bit order bit S1 501 is used to indicate that the value is a gray scale value: zero means grayscale 515, one means Doppler 525 and 535. The low order bit, S0 502, is used to indicate red scale or blue scale: zero means red scale 525, one means blue scale 535. In the ZLN combination, the remaining unused bits, U, are used for a repeat count, C, such that W equals 2+N+U (FIG. 5G).

N bits of the blue component of the pixel value is used to index into a blue encode table to obtain the encoded value, E. In the ZLN method, if E is repeated, a repeat count, C, is incremented.

X 557 is a concatenation of S1, S0, E, and C.

In this embodiment, like the ZLN method, the pixels of the frame are processed pixel by pixel as disclosed in reference to FIGS. 4A and 4B. When a value, E, is not repeated X is placed in the next location in the compression array with a repeat count, C, equal to one.

Three decode tables that correspond to the grayscale, red scale, and blue scale encode tables contain the data necessary to reconstruct the original value for the appropriate image. If the target color image format is W*4 bit color (FIG. 2A), then the decode table has W bits for alpha 208, red 206, green 204, and blue 202 each, respectively. If the target color image format is W*3 bit color, then the alpha value is not used. If the image is W bit grayscale than only the grayscale value is used to create the decompressed and decoded image.

To decode and decompress, the encoded data is processed W bits at a time as X. S1, S0, E, and C are extracted from X with appropriate masks and shifts. If S1 is zero indicating grayscale, E is used as an index into the gray scale decode table. If S1 is one indicating Doppler and S0 is zero indicating red scale Doppler, E is used as an index into the red scale decode table (FIG. 11C). If S1 is one indicating Doppler and S0 is one indicating blue scale Doppler, E is used as an index into the blue scale decode table (not shown, but with the proper values in the blue bit column 1126). The decoded value is placed into the decoded and decompressed image. Each X is processed in order until the compressed array length, L, has been processed.

FIG. 6

Encoded Data Stream

Figure 6:
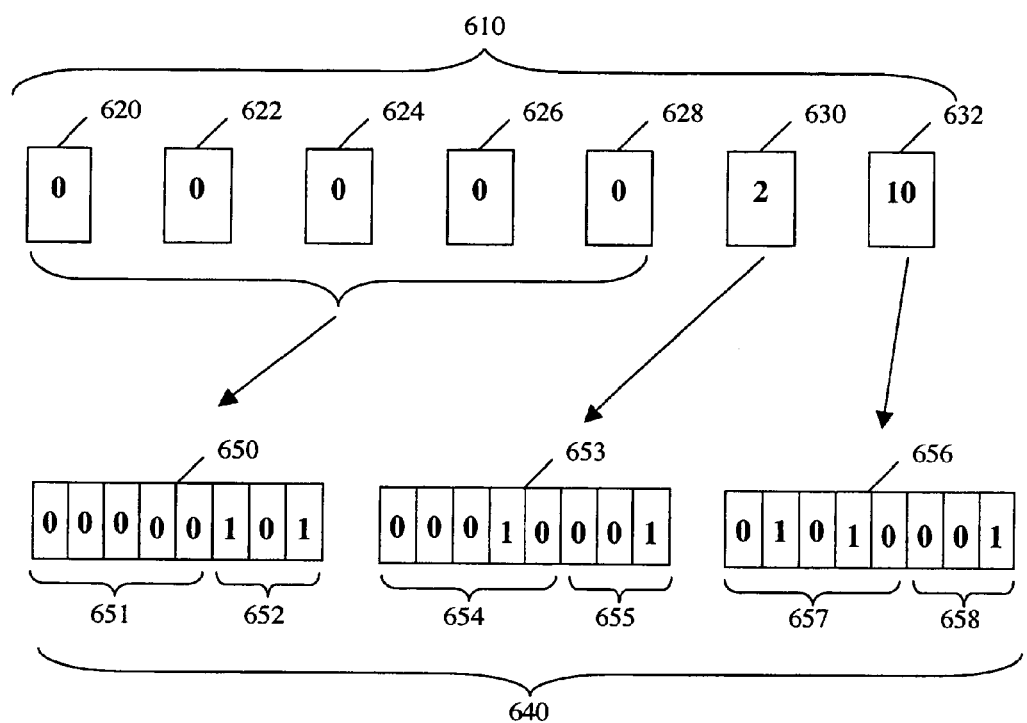
FIG. 6 shows a series of codes and the resulting encoded stream.

FIG. 6 shows a series of exemplary decimal values 610 comprising a first value 620 equal to decimal 0, a second value 622 equal to 0, a third value 624 equal to 0, a fourth value 626 equal to 0, a fifth value 628 equal to 0, a sixth value 630 equal to 2, and a seventh value 632 equal to 10. The value of zero is merely exemplary and could be any binary value. After the encoding step 130 (FIG. 1), the corresponding encoded data 140 (FIG. 1) would be compressed down to three bytes of binary code 640 comprising a first byte 650, a second byte 653, and a third byte 656 each containing a merged value and count, (651, 652), (654, 655), and (657, 658), respectively. The first data 651 has a binary value of "00000" which equals the exemplary repeated decimal value. The first count 652 has a binary value "101" which equals decimal five representing the run-length of the repeating value in the first five of the decimal values 610. The second data 654 has a binary value of "00010" which equals the non-repeated decimal value two. The second count 655 has a value of 1. The third data 657 has a binary value of "01010" which equals the non-repeated decimal value ten. The third count 658 has a value of 1.

FIG. 7

RHN Codes and Encoded Stream

Figure 7:
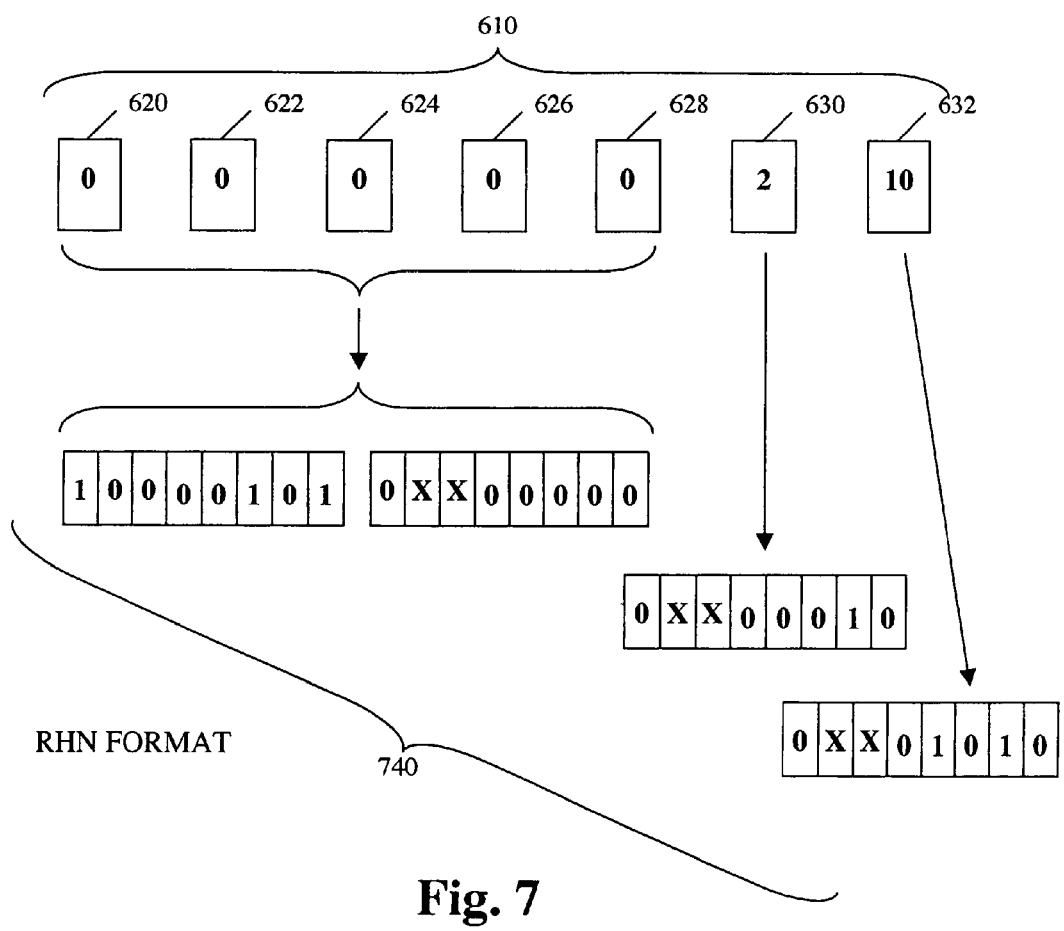
FIG. 7 shows a series of codes and the resulting encoded stream of the RI-IN method.

FIG. 7 shows the same series of decimal values 610 (FIG. 6) comprising the first value 620 equal to decimal 0, the second value 622 equal to 0, the third value 624 equal to 0, the fourth value 626 equal to 0, the fifth value 628 equal to 0, the sixth value 630 equal to 2, and the seventh value 632 equal to 10. After encoding by RHN, the corresponding encoded data 140 (FIG. 1) would be compressed down to four bytes of RHN binary code 740.

The embodiment of the present invention shown in FIG. 6 only requires three bytes to encode the same data. In this example, the present invention is 25% better than the RHN format.

Figure 8A:
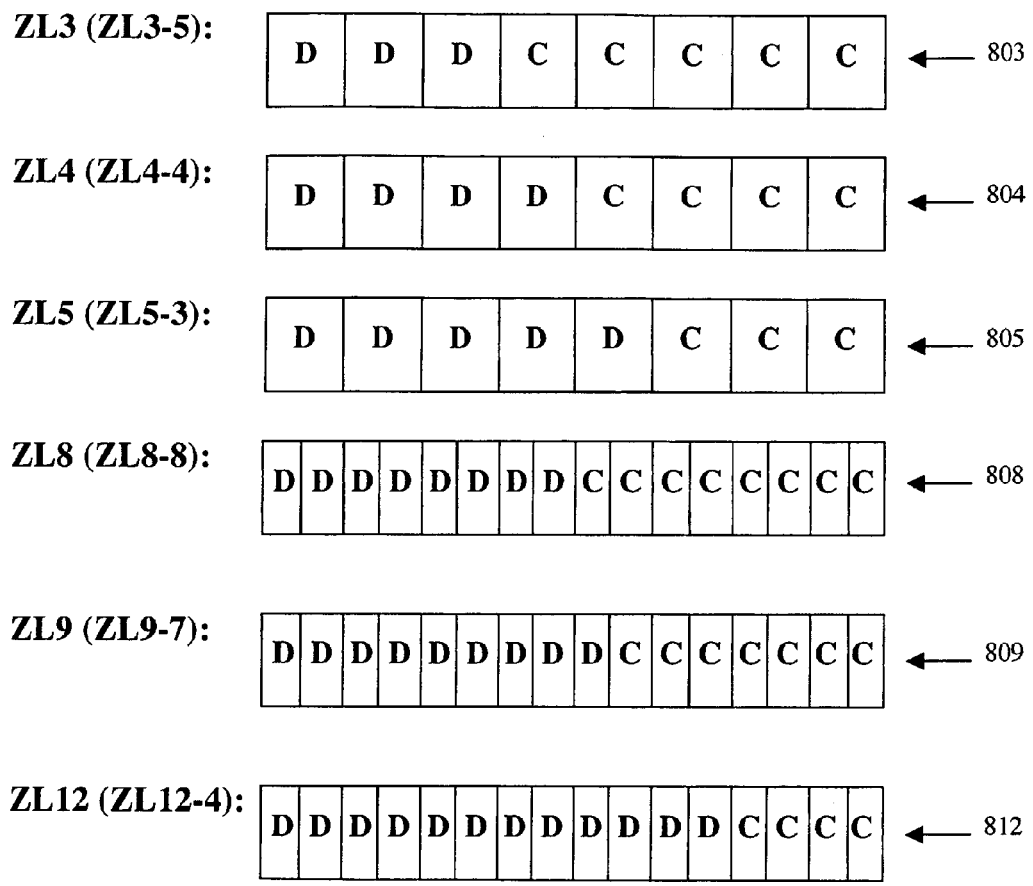
FIG. 8A shows examples of variable formats.
Figure 8B:
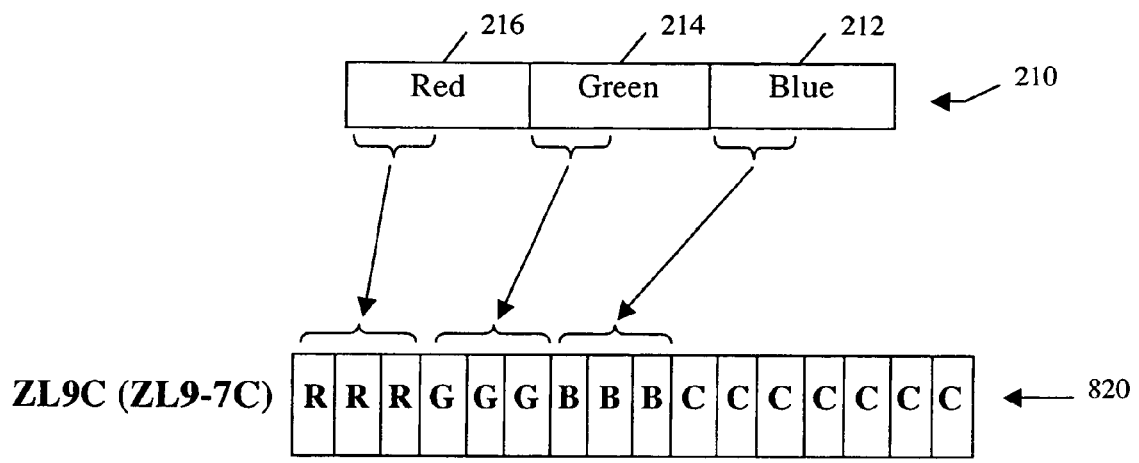
FIG. 8B shows a format that preserves 9 bits of color.

FIGS. 8A and 8B

ZLN Formats

The ZLN aspect of the present invention provides for variable formats. The values of N 300, U 301, and W 302 can be dynamically changed between frames. For ease of communication a format is named with the prefix "ZL" and a digit representing the value of N. For example, "ZL5" refers to a format where bit width of N is equal to 5. There are multiple values of U depending of the W. To also specify the bit width of U a hyphen and a number can be appended. For example, "ZL5-13" represents a format where N=5 and U=13. "ZL5-3" is a common format and may be imprecisely referred to as "ZL5."

FIG. 8A shows a number of formats with adjacent labels: ZL3 803, ZL4 804, ZL5 805, ZL8 808, ZL9 809, and ZL12 812. Data bits are represented by "D," and count bits are represented by "C".

FIG. 8B shows how the most significant 3 bits of each color component (216, 214, and 212 of FIG. 2B) are extracted and formatted in ZL9-7C format (the "C" append indicates that the color is preserved). With three red bits represented by "R", three green bits represented "G" and three blue bits represented by "B".

Decoding

To decode the compressed array, the decoder has a decode table that corresponds with the encode table. For W*4 bit color pixels, the decode table contains the appropriate alpha, red, green, and blue values. For W*3 bit color pixels, the alpha value is not used. The compressed array is processed W bits at a time as X. The repeat count, C, is extracted from X by masking off the data value (C=X & (((2N)−1)<<U)). The encoded value, E, is extracted from X by masking off the count (E=X & ((2U)−1)). The encoded value, E may be used to index into the decryption. The decoded pixels are placed in a reconstructed image and repeated C times. Each element of the compressed array, A, is processed until its entire length, L, has been processed.

FIG. 9

Decode Flowchart

Figure 9:
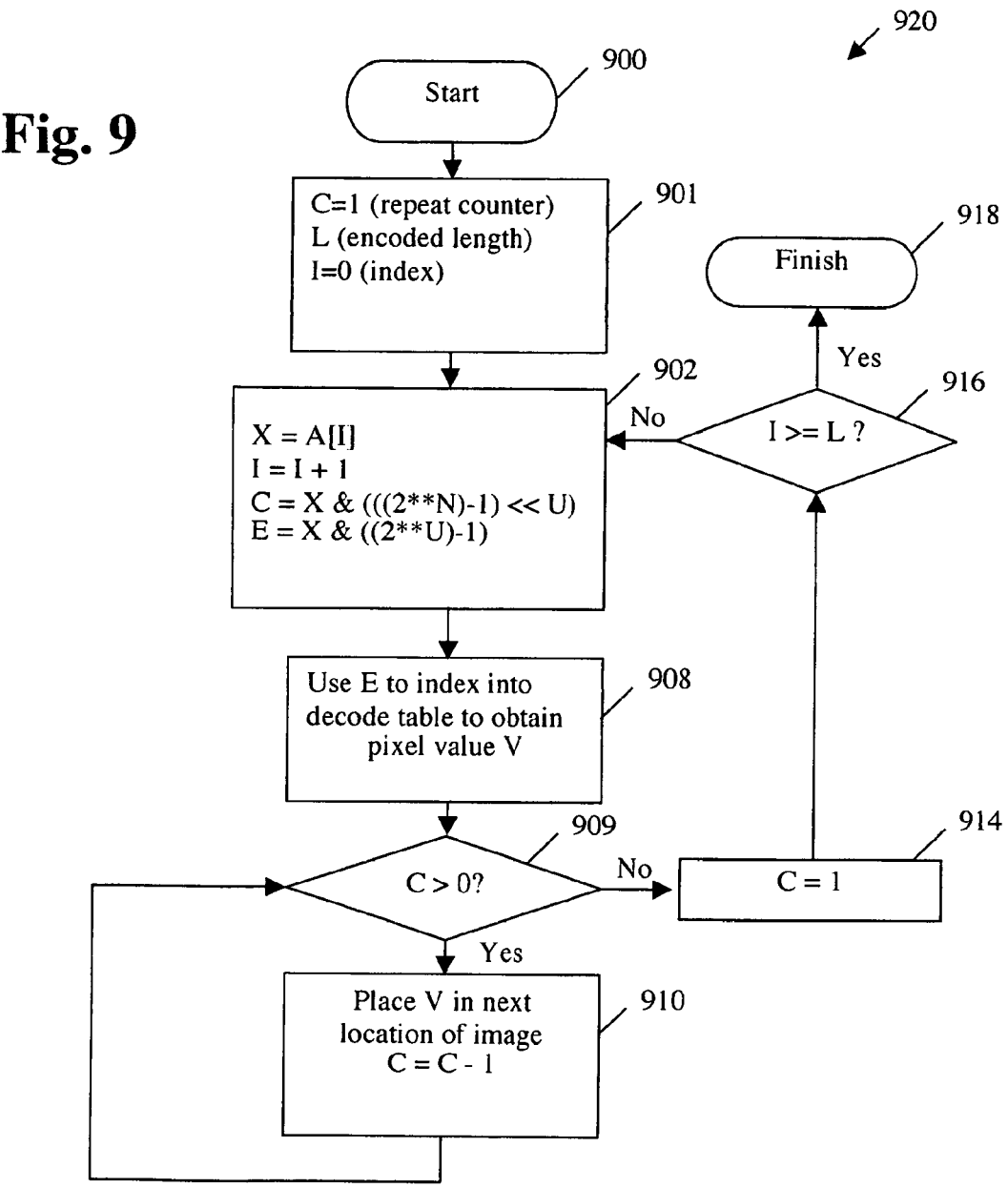
FIG. 9 shows the flow chart for the decompression method.

FIG. 9 illustrates the decode flowchart 920 which presents the details of the decryption embodiment of the decode step 160 (FIG. 1) and the image reconstitution step 180 (FIG. 1).

The decoding begins at a decode entry 900. In a "decode initialization" step 901, a repeat counter C is set to one, an encoded length L is set to the value obtained with the encoded data 140 (FIG. 1), and an index I is set to 0. Next, a "get code" step 902 obtains a signed byte X from the encoded data 140 (FIG. 1) array A. The index I is incremented. The count (for example the 3-bit count 380 as shown in FIG. 3B) is extracted from X by masking off the data bits and placed in the repeat counter C (C=X & ((2N)-1<<U). The value of E is extracted from X by masking off the count bits (E=X & (2U)-1). In practice, the count mask and value mask can be pre-computed with the following two lines of code in the C programming language:

```
valueMask = -1 << U;
countMask = ~valueMask;
```

In this illustrative decryption embodiment of the present invention, flow goes to a "decode lookup" step 908 where the value of E is used to index into the decode table 1110 (FIG. 11, shown as decryption table) to obtain a pixel value V. In the other embodiments where E is not encrypted, E is used as V and step 908 is bypassed. Flow continues to a "check zero count" 909 decision.

The 909 decision always fails the first time ensuring that a place pixel step 910 is executed. The place pixel step 910 places the pixel value V in the next location of the decompressed image and decrements the repeat counter C and returns to the 909 decision. The pixel value V is placed repeatedly until C decrements to zero. Then the 909 decision branches flow to a "reset counter" step 914. At step 914 the repeat counter is reset to 1.

Flow continues to the "check length" 916 decision where the index I is compared to the encoded length L to determine if there are more codes to be processed. If I is less than L flow returns to step 902, otherwise the decode process terminates at a "decode exit" 918.

The entire decode process is repeated for each encoded frame image.

FIG. 10

Interpolation

Figure 10:
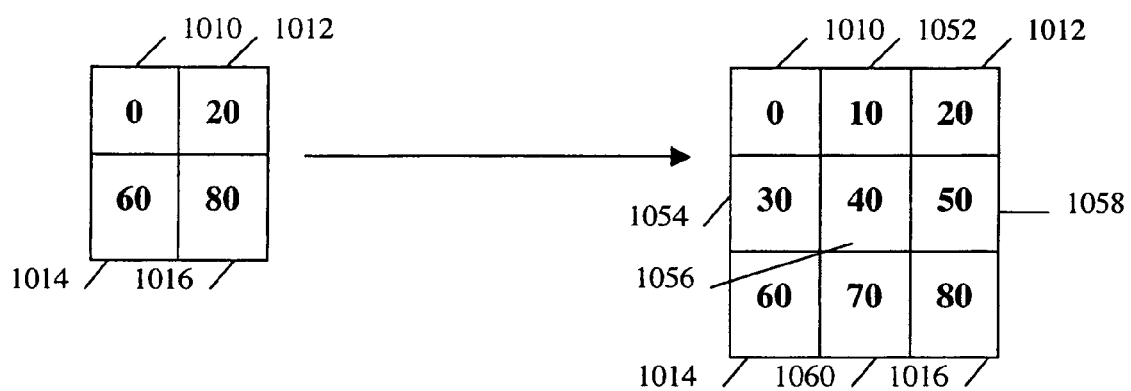
FIG. 10 shows image stretching by interpolation.

FIG. 10 illustrates interpolation when two adjacent pixels 1010 and 1012 and two subsequent row adjacent pixels 1014 and 1016 are stretched to insert a new row and column of pixels.

Pixels 1052, 1054, 1056, 1058 and 1060 are inserted due to the enlargement of the image. Their values are calculated by averaging the values of the two pixels above and below or to the left or the right of the new pixel. A preferred sequence is calculation of:
1. 1052 between 1010 and 1012
2. 1054 between 1010 and 1014
3. 1058 between 1012 and 1016
4. 1056 between 1054 and 1058

Pixel 1060 can be calculated on the interpolation for the subsequent row.

FIG. 11

Encryption

By using corresponding encoding and decoding tables the data can be encrypted and decrypted without using actual values. Encryption provides a level of security for the encoded data 140 while in storage or transit.

FIG. 11 shows an example of an encryption table 1100, where N is 3 and W is 8, and a decryption table 1110, where N is 3 and U is 5.

The encode table 1100 is 2 to the power of N in length. If the target color image format is W*4 bit color, then the decode table 1110 has W bits for alpha, red, green, and blue each, respectively. If the target color image format is W*3 bit color, then the alpha value is not used. If the image is W bit grayscale then only the grayscale value is used to create the decompressed and decoded image.

The corresponding table elements are mapped to each other. For example, 0 could encode to 22 as long as the $22^{nd}$ element of the decode table returns (0xff<<24|0<<16|0<<8|0).

When these versions of the tables are used, the encode and decode processes and their speed of execution are substantially the same but the encoded data 140 (FIG. 1) becomes a cipher and has a higher level of security. It should be recognized by one with ordinarily skill in the art that there are other embodiments of the present invention with different encryption/decryption table rearrangements.

FIGS. 12A through 12D

Compression and Decompression Devices

Figure 12A:
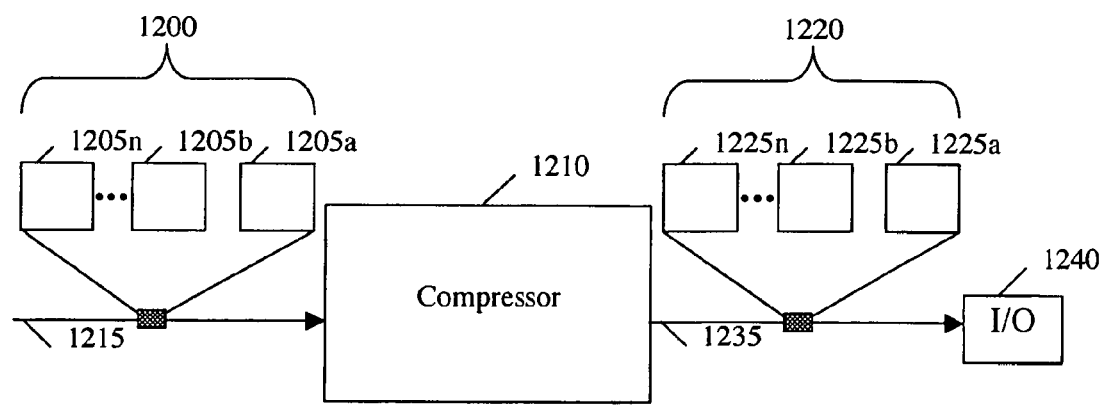
FIGS. 12A and 12B show machines for compressing and decompressing, respectively.
Figure 12B:
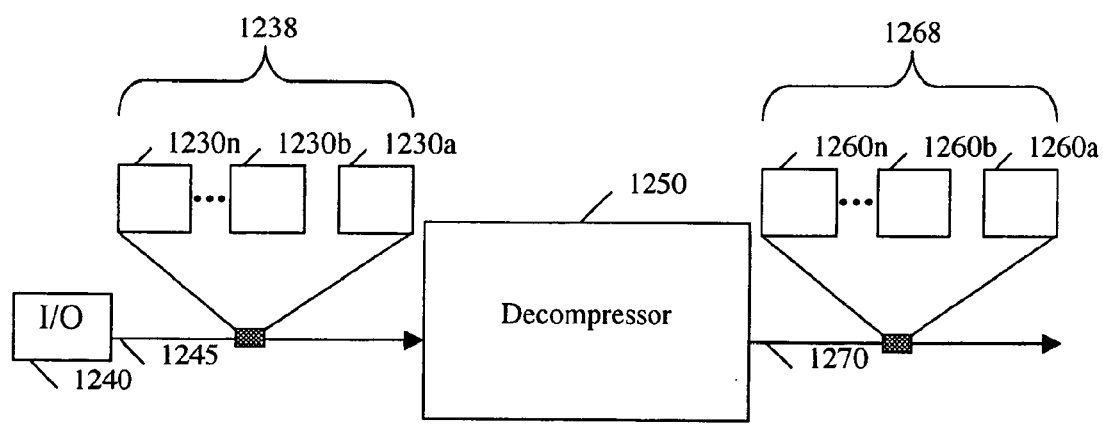

FIGS. 12A and 12B show devices for compressing and decompressing, respectively, a stream of video frames.

FIG. 12A shows a video signal 1215 being compressed and encoded by a compressor 1210 to form an encoded data stream 1235, which is sent to an I/O device 1240. The video signal 1215 comprises a series of video frames 1200, shown as first video frame 1205a, second video frame 1205b, ... through nth video frame 1205n. The encoded data stream 1235 comprises a series of encoded data 1220, shown as first encoded data 1225a, second encoded data 1225b, ..., through nth encoded data 1225n.

FIG. 12B shows an input encoded data stream 1245 being received from an I/O device 1240, and then, decoded and decompressed by a decompressor 1250 to form a video sequence 1270. The input encoded data stream 1245 comprises received encoded data 1238, shown as first received encoded data 1230a, second received encoded data 1230b, through nth received encoded data 1230n. The video sequence 1270 comprises a series of decoded video frames 1268, shown as first decoded video frame 1260a, second decoded video frame 1260b, ..., through nth decoded video frame 1260n.

Figure 12C:
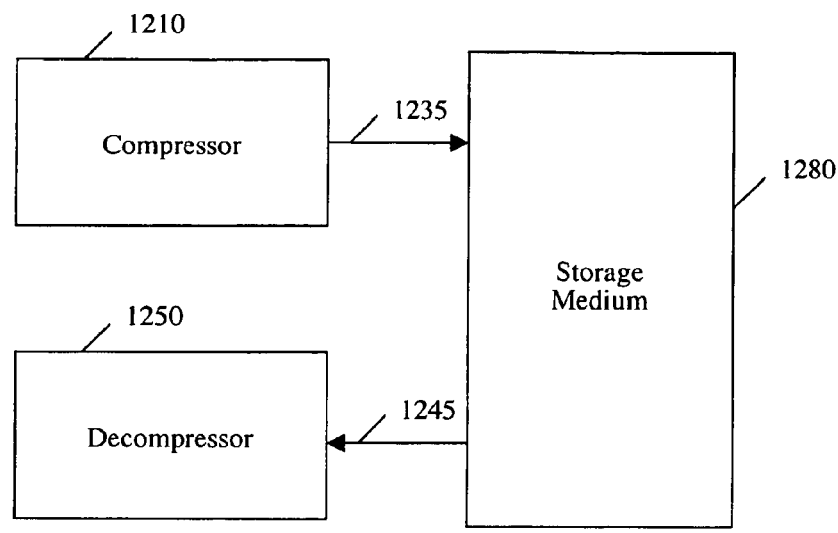
FIG. 12C shows a compressor and decompressor connected to a storage medium.

FIG. 12C shows an embodiment where the I/O device 1240 of FIGS. 12A and 12B is a storage medium 1280. The encoded data stream 1235 from the compressor 1210 is stored in the storage medium 1280. The storage medium 1280 provides the input encoded data stream 1245 as input to the decompressor 1250.

Figure 12D:
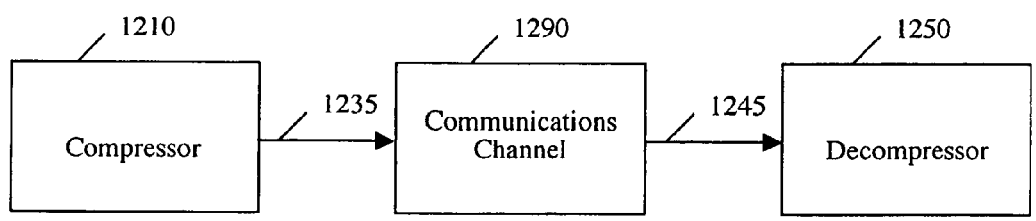
FIG. 12D shows a compressor and decompressor connected to a communications channel.

FIG. 12D shows an embodiment where the I/O device 1240 of FIGS. 12A and 12B is a communications channel 1290. The encoded data stream 1235 from the compressor 1210 is transmitted over the communications channel 1290. The communications channel 1290 provides the input encoded data stream 1245 as input to the decompressor 1250.

FIGS. 13A through 13J

Compressor Details, Encoding Circuit, and Bitwise Pixel Sub-Samplers

Figure 13A:
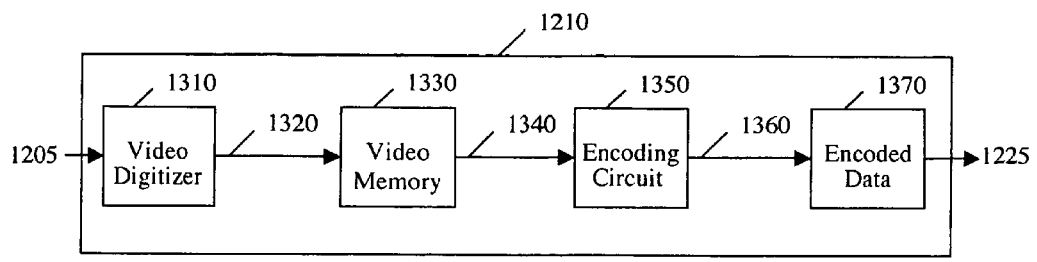
FIG. 13A shows elements of a compressor.

FIG. 13A shows details of an embodiment of the compressor 1210, which comprises a video digitizer 1310, a video memory 1330, an encoding circuit 1350, and encoded data 1370. Each video frame 1205 in the series of video frames 1200 is digitized by the video digitizer 1310 and stored along path 1320 in the video memory 1330. The encoding circuit 1350 access the digitized video frame via path 1340 and outputs the encoded data 1370 along path 1360. The encoded data 1225 corresponding to each video frame 1205 is then output from the compressor 1210.

Figure 13B:
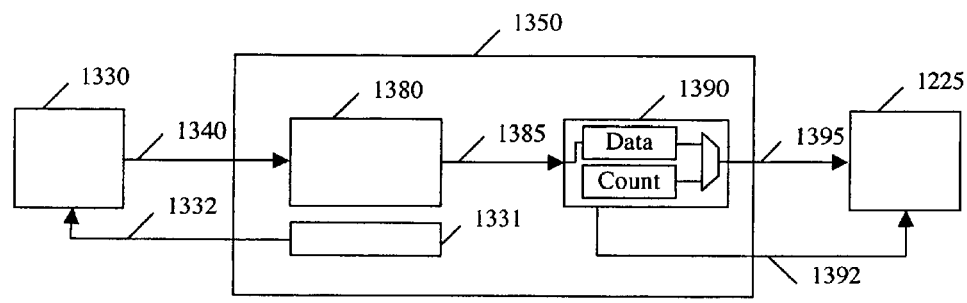
FIG. 13B shows an embodiment of an encoding circuit.

FIG. 13B shows further details of an embodiment of the encoding circuit 1350. A pixel sub-sampler 1380 scans each pixel from the digitized video frame in the video memory 1330. A pixel index 1332 is used to drive a scan 1331 signal to select each pixel from the video memory, in a predetermined sequence. A novel aspect of the present invention is that the compression method can be accomplished with a single scan of the video memory for each frame. The pixel sub-sampler 1380 selects a predetermined number of bits from each pixel and outputs the data value along path 1385. Alternatively, the pixel sub-sampler 1380 encodes the sub-sampled data by using a lookup table similar to FIG. 11A. Different pixel sub-samplers 1380 will be discussed in reference to FIGS. 13C through 13J. The data/count 1390 unit increments the count each time the output of the pixel sub-sampler 1380 is the same; otherwise, when the output of the pixel sub-sampler 1380 is different (or when the counter reaches the maximum count value, the data and count are combined as a code and output along path 1395 to the encoded data 1225 for the frame currently in the video memory 1330. The location of the code in the encoded data 1225 is selected by the code index 1392 signal.

Figure 13C:
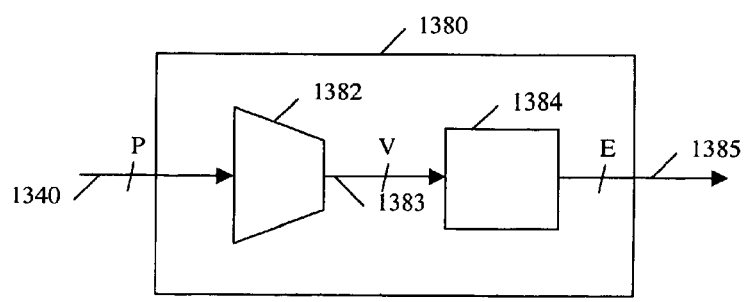
FIG. 13C shows a generic pixel sub-sampler.

FIG. 13C shows further details of a generic pixel sub-sampler 1380. When a pixel is scanned from video memory along path 1340, it has an original pixel bit width, P. A pixel extractor 1382 extracts a subset of bits from each pixel with a value bit width, V, along value path 1383. The value bit width V is less than the pixel bit width P. A coder 1384 takes the V bits from the pixel path 1383 and outputs a code with an encoded bit width, E, as the data value along path 1385. One embodiment of the coder is a null coder, or pass-through coder. Another embodiment of the coder uses an encryption table to encrypt the data value as an encrypted data value.

FIGS. 13D through 13J show embodiments of pixel sub-samplers.

Figure 13D:
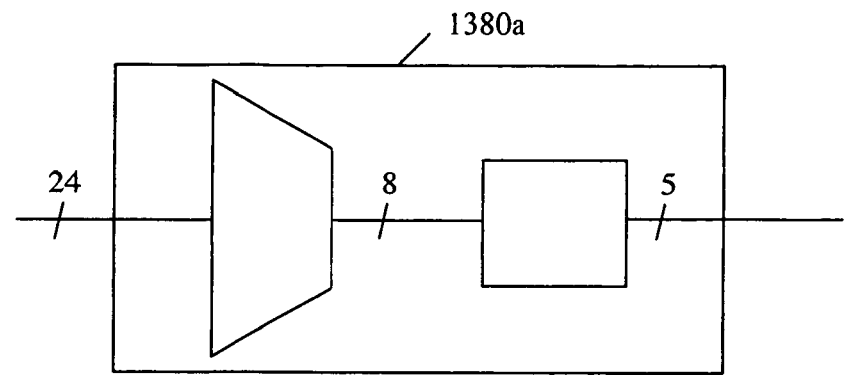
FIGS. 13D through 13J show embodiments of pixel sub-samplers.

FIG. 13D illustrates a 24 to 5 bit sub-sampler 1380a, where the pixel bit width, P, is 24; the value bit width, V, output from the pixel extractor 1382 is 8 (see FIG. 2H); and the encoded bit width, E, output from the coder 1384 is 5. In this embodiment, the extracted 8 bits could be any component of the grayscale (e.g. FIG. 2G) or the high order 8 bits of the 24-bit value.

Figure 13E:
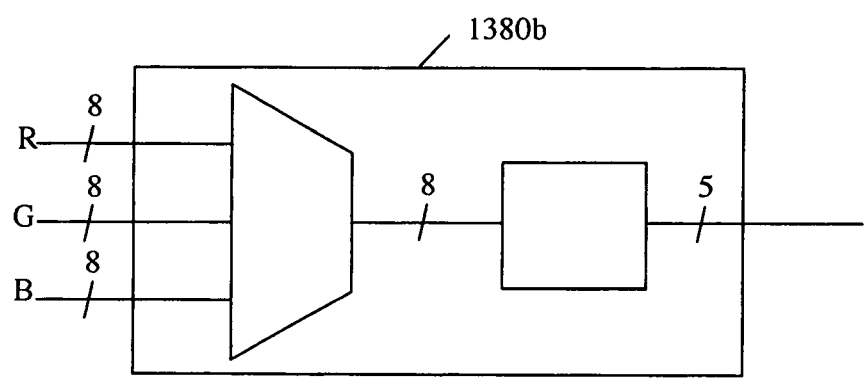

FIG. 13E illustrates a 24-bit RGB to 5 bit sub-sampler 1380b, where the pixel bit width, P, is 24 divided into 8 bits of red, green, and blue (RGB, see FIG. 2B); the value bit width, V, output from the pixel extractor 1382 is 8; and the encoded bit width, E, output from the coder 1384 is 5. In this embodiment, the extracted 8 bits could be an average (e.g. FIG. 2C) or one of the colors (e.g. FIG. 2D, 2E, or 2F).

Figure 13F:
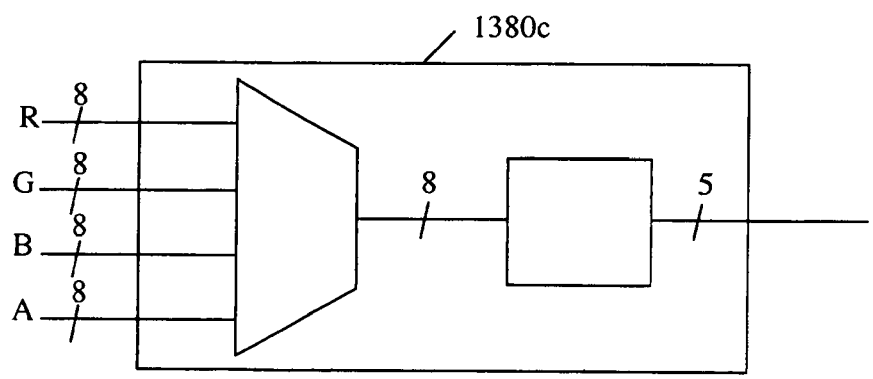

FIG. 13F illustrates a 32-bit RGB to 5 bit sub-sampler 1380c, where the pixel bit width, P, is 32 divided into 8 bits of red, green, blue, and alpha (see FIG. 2A); the value bit width, V, output from the pixel extractor 1382 is 8; and the encoded bit width, E, output from the coder 1384 is 5. In this embodiment, the extracted 8 bits could be an average (e.g. FIG. 2C) or one of the colors (e.g. FIG. 2D, 2E, or 2F).

Figure 13G:
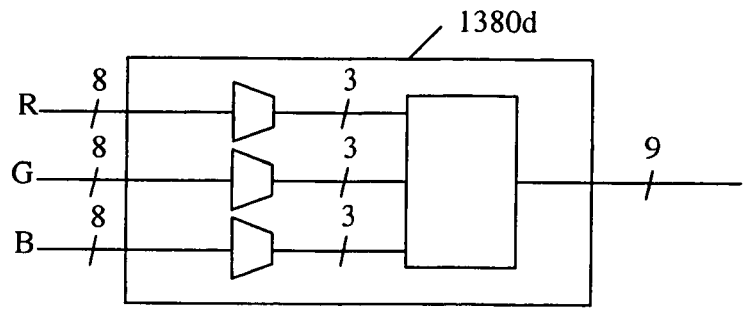

FIG. 13G illustrates a color 9-bit sub-sampler 1380d, where the pixel bit width, P, is 24 divided into 8 bits each of red, green, and blue; the value bit width, V, output from the pixel extractors 1382 is 9; and the encoded bit width, E, output from the coder 1384 is 9. In this embodiment, the high order 3 bits of each color component are selected (e.g. ZL9C shown FIG. 8B).

Figure 13H:
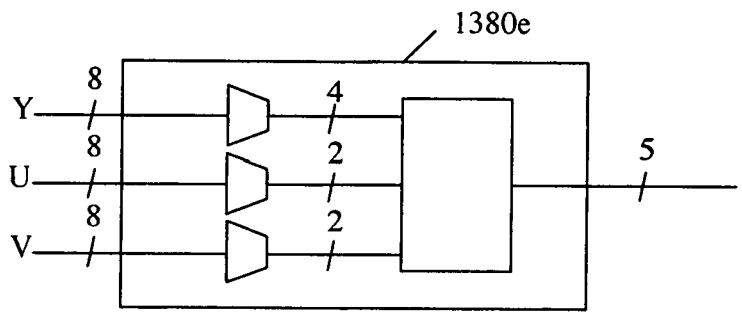

FIG. 13H illustrates a YUV sub-sampler 1380e, where the pixel bit width, P, is 24 divided into 8 bits for each of YUV; the value bit width, V, output from the pixel extractors 1382 is 8; and the encoded bit width, E, output from the coder 1384 is 5. In this embodiment, four bits of the Y value is extracted and 2 bits of each of the U and V values are extracted. This 8 bit value is further coded as a 5 bit value.

Figure 13I:
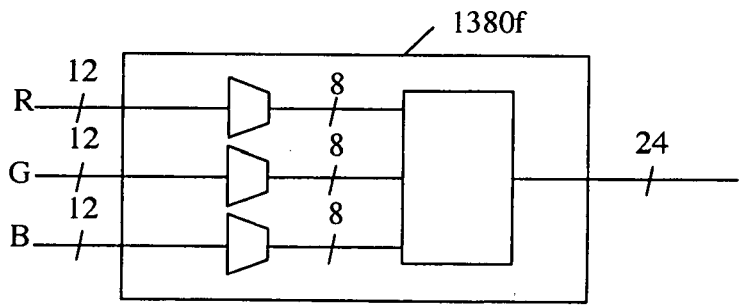

FIG. 13I illustrates a 36-bit RGB to 24-bit sub-sampler 1380f, where the pixel bit width, P, is 36 divided into 12 bits each of red, green, and blue; the value bit width, V, output from the pixel extractors 1382 is 24; and the encoded bit width, E, output from the coder 1384 is also 24. In this embodiment, the high order 8 bits of each 12-bit color component are selected.

Figure 13J:
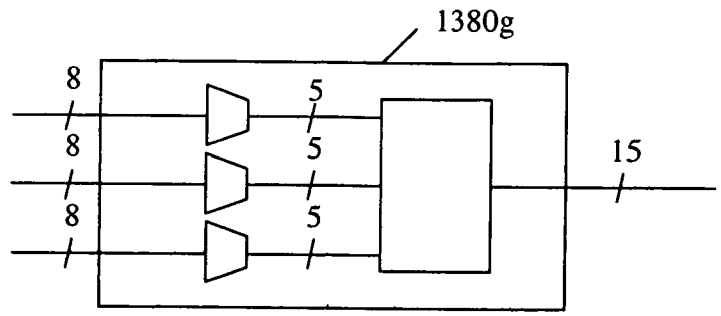

FIG. 13J illustrates a 15-bit sub-sampler 1380g, where the pixel bit width, P, is 24 divided into 8 bits from each color component; the value bit width, V, output from the pixel extractor 1382 is 15; and the encoded bit width, E, output from the coder 1384 is 15. In this embodiment, the high order 5 bits of each 8-bit color component are selected.

Figure 14B:
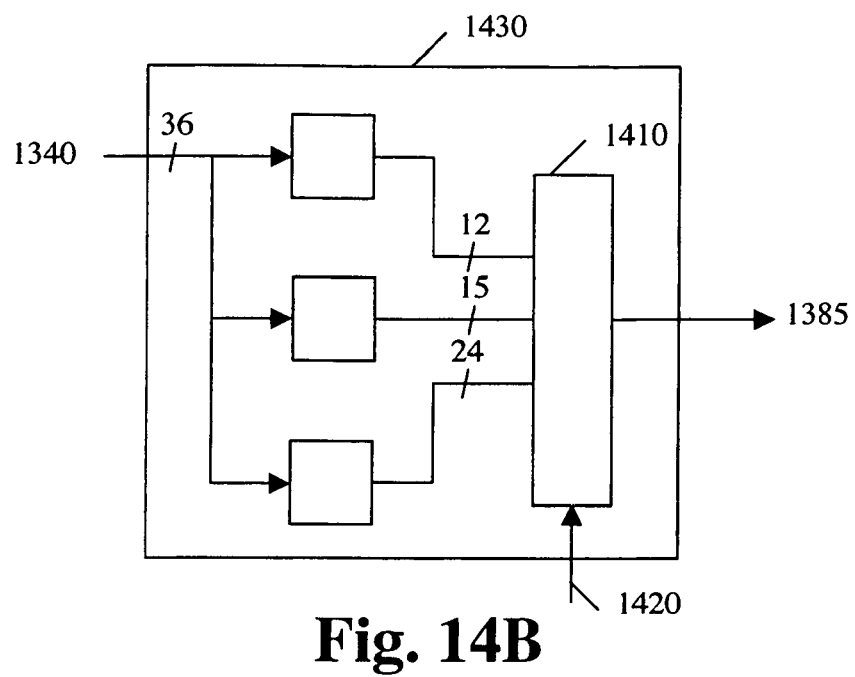
Figure 14C:
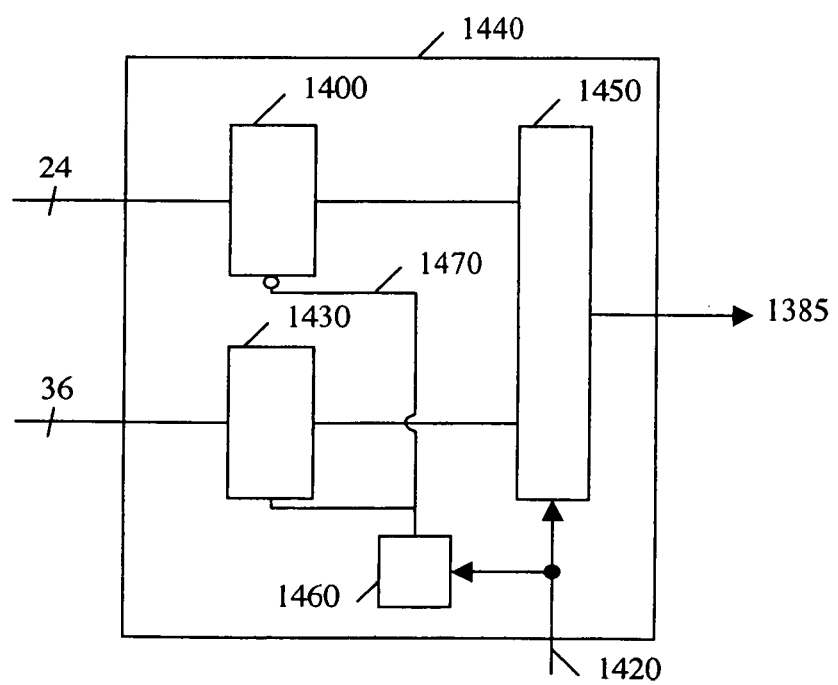

FIGS. 14A through 14C

Variable Selection of Bit-Wise Sub-Sampling

FIGS. 14A through 14C show embodiments of a device for variably altering the number of bits.

FIG. 14A illustrates 24-bit to variable bit sub-sampler 1400. When a pixel is scanned from video memory along path 1340, it has an original pixel bit width, P, equal to 24 bits. These 24 bits are passed as input to a number of sub-samplers. The variable number of bits is selected by a number of bits selector 1410 as indicated by a number of bits indicator 1420 and outputs a code with an variable encoded bit width, E, as the data value along path 1385. A user at remote receiver 1610 sets the number of bits indicator 1420 (see discussion regarding FIGS. 16A and 16B). The variable bit sub-sampler comprises a generic 3-bit sub-sampler 1401, a generic 4-bit sub-sampler 1402, generic 8-bit sub-sampler 1403, and generic 10-bit sub-sampler 1404 which are embodiments of the generic sub-sampler shown in FIG. 13C with specific values for E. The variable bit sub-sampler further comprises nested sub-samplers: the 24 to 5 bit sub-sampler 1380a of FIG. 13D, the 1380d of FIG. 13G, and the 15-bit sub-sampler 1380g of FIG. 13J. This is illustrative of the types of bit sub-samplers that can be variably selected.

Likewise, FIG. 14B illustrates a 36-bit to variable bit sub-sampler 1430, where P is 36 and the number of bit that can be selected are 12, 15, or 24, respectively.

FIG. 14C shows that the 24-bit to variable bit sub-sampler 1400 of FIG. 14A and the 36-bit to variable bit sub-sampler 1430 of FIG. 14B can be further combined to form at 24/36 bit variable bit sub-sampler 1440 where a second selector 1450 is used to selected either the 24 bit inputs or the 36 bit inputs using selection logic 1460 that also receives the number of bits indicator 1420. A selection signal 1470 enables either the output of 24-bit to variable bit sub-sampler 1400 or the output of 36-bit to variable bit sub-sampler 1430. Sub-samplers 1400 and 1430 both receive the number of bits indicator 1420 as shown in FIG. 14A and FIG. 14B. In this way any number of bits may reasonably be selected from either a 36 or 24-bit pixel bit width.

FIG. 15

Decompressor Elements

Figure 15:
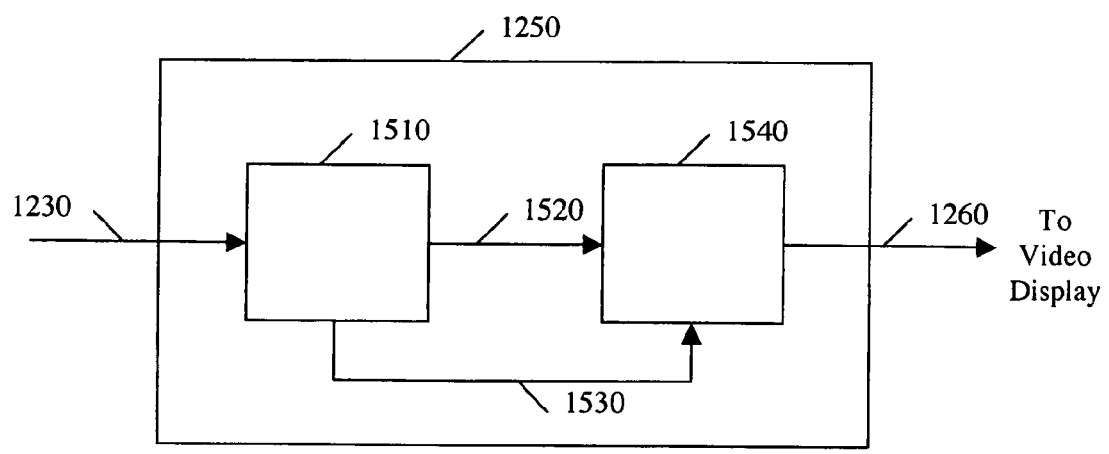
FIG. 15 shows elements of a decompressor.

FIG. 15 shows details of an embodiment of the decompressor 1250, which comprises a decoding circuit 1510 which inputs received encoded data 1230 and outputs decoded pixel values 1520 to an image memory 1540. A decoder pixel index 1530 selects the location in the image memory 1540 to store the decoded pixels values 1520. The image memory 1540 delivers each decoded video frame 1260 to the video display.

Figure 16A:
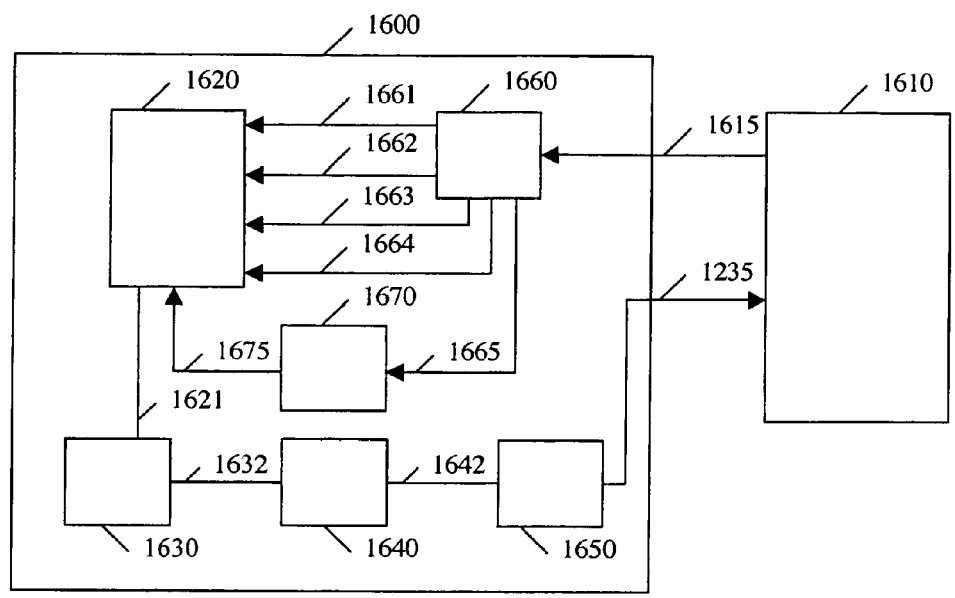
FIG. 16A shows elements for setting width, height, frame rate, brightness, and contrast which are variably altered by a receiver.
Figure 16B:
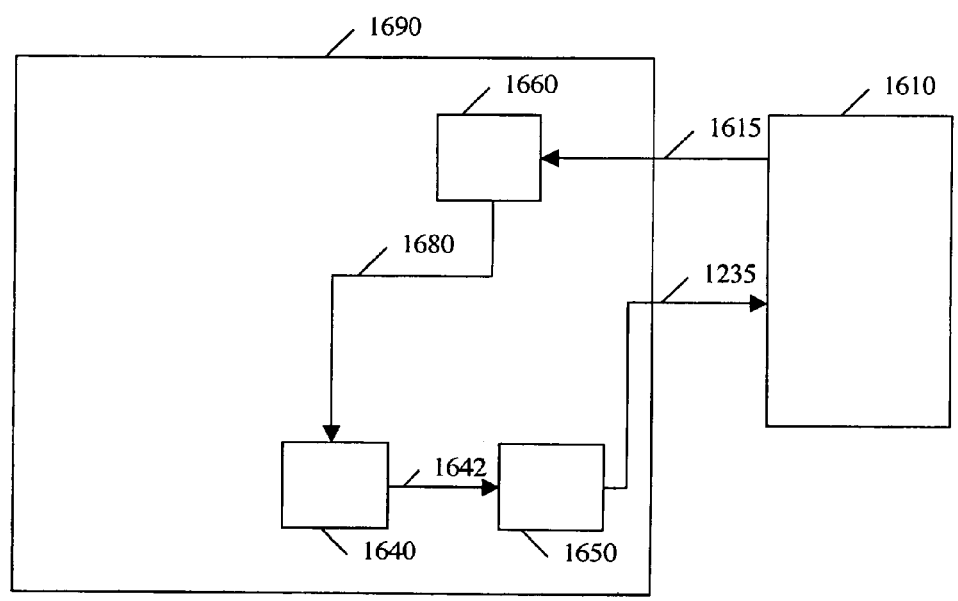
FIG. 16B shows elements for setting the number of pixel bits that are variably altered by a receiver.

FIGS. 16A and 16B

Parameters Altered by a Remote Receiver

FIG. 16A shows a system for setting width, height, frame rate, brightness, and contrast in a transmitter 1600 which are variably altered by a receiver 1610. The receiver sends commands to the transmitter 1600 via setting control path 1615. The commands alter the transmitter settings 1660.

The settings 1660 include brightness 1661, contrast 1662, height 1663, width 1664, and frame rate 1665. The brightness 1661, contrast 1662, height 1663, and width 1664 setting alter the attributes of each frame as it is digitized in a frame sub-sampler 1620. The brightness 1661 and contrast 1662 settings alter the video digitizer 1310 (FIG. 13A) as it senses the video frame. The height 1663 and 1664 allow for optionally selecting a subset area of each frame; this is area sub-sampling. Alternatively, height 1663 and 1664 allow for optionally selecting a subset of pixels from an array of pixels that make up a single frame, by skipping pixels in a row or by skipping rows; this is image sub-sampling. The frame rate 1665 setting alters the frame selector 1670 which drives the frame select indicator 1675 to optionally sub-sample frames from a sequence of video frames; this is frame sub-sampling.

The frame sub-sampler 1620 outputs a selected frame 1630 along path 1621. The transmitter pixel sub-sampler 1640 scans the selected frame 1630 getting each pixel from frame 1632 and outputs data values along path 1642 to a run length encoder 1650. The encoded data stream 1235 is then transmitted to the remote receiver 1610.

FIG. 16B shows additional elements of a system for setting the number of pixel bits in an alternate transmitter 1690 which is variably altered by a receiver 1610. The receiver sends commands to the transmitter 1600 via setting control path 1615. The commands alter the transmitter settings 1660. The settings include a number of pixel bits setting 1680 which affect the number of bits selected by the transmitter pixel sub-sampler 1640. The pixel sub-sampler 1640 could be any pixel sub-sampler, for example, see FIG. 13C through 13J and 14A through 14C. The transmitter pixel sub-sampler 1640 scans the selected frame 1630 (as in FIG. 16A) getting each pixel from frame 1632 and outputs data values along path 1642 to a run length encoder 1650. The encoded data stream 1235 is then transmitted to the remote receiver 1610.

These embodiments illustrate the novel feature of the present invention of allowing a user at a remote receiver 1610 to control aspects of the transmitter 1600 or 1690 from a remote location, including brightness, contrast, frame dimensions, frame rate, image area, and the type of compression used.

FIG. 17

Further Lossless Compression Step

Figure 17:
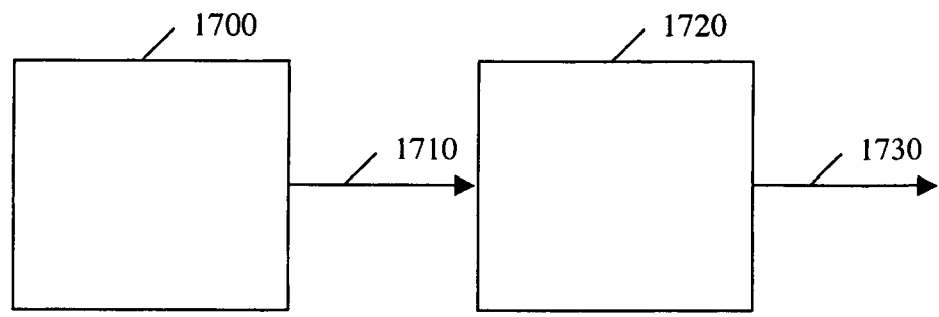
FIG. 17 shows a lossless compression step for further compression of an encoded data buffer.

FIG. 17 shows a lossless compression step for further compressing an encoded data buffer. After a run-length encoding step 1700 in the transmitter, a run-length encoded output 1710 can be further processed with a further lossless compression step 1720 resulting in further lossless compression output 1730. The further lossless compression step 1720 could be implemented as a variable length coding, arithmetic coding, or other compression step known in the art.

FIG. 18

Image Stretching

Figure 18:
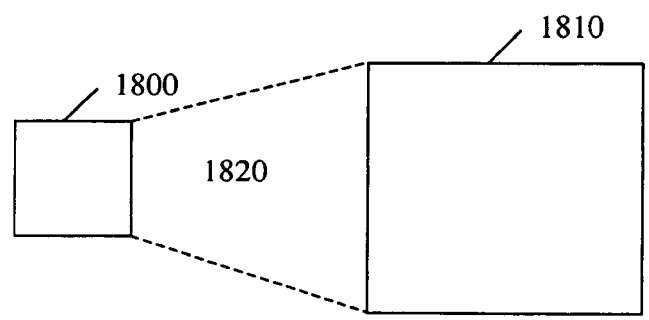
FIG. 18 shows images being enlarged by stretching.

FIG. 18 shows images being enlarged by stretching. An unstretched frame 1800 is stretched during stretching step 1820 resulting in an enlarged image 1810. When a frame is image sub-sampled or area sub-sampled, the remaining data can be stretched to fill the full display area on the receiver 1610. This results in an interpolated image or magnified image, respectively.

Distinguishable Characteristics

Most video images contain regions that are distinguishable from the other pixels that make up an image. Sometimes the distinguishing characteristic is the importance of the region to the viewer. In medical imaging such as ultrasound, the generated image in the center of the display may be of most importance to the viewer. Sometimes the distinguishing characteristic is the compressibility of the regions. Sometimes the distinguishing characteristic is the color depth of the regions. Sometimes the distinguishing characteristic is the rate of change of the regions.

A region of solid color or grayscale value compresses more efficiently than a series of varying values. This is true of the ZLN compression method. If the regions are distinguished based on their compressibility, different compression methods can be applied to each region.

Grayscale pixel values can be stored in 8 bits while the corresponding quality of color pixel is often stored in 24 or 32 bits. If the regions are distinguished based on their storage requirements (also known as color depth, or bit depth), a significant space or bandwidth saving can be made.

A Doppler enhanced image such as a weather map or an ultrasound medical image is synthesized by the Doppler circuitry. In the case of a weather map, the underlying image does not change but the Doppler enhanced velocity scales do change from frame to frame. In the case of Doppler enhanced ultrasound image, the underlying grayscale ultrasound image changes more frequently than the circuitry can calculate and display the Doppler information. If the Doppler and non-Doppler regions are processed separately the overall effective compression sizes and transmission times can be reduced.

Automatic Switching between Grayscale Only and Doppler Enhanced Formats

As disclosed, for example in U.S. application Ser. No. 09/321,922 regarding its FIG. 2, the video image capture device receives a stream of video images (1200) from a video source. The compressor 1210 is configured to compress the stream of video images 1200 thereby creating a compressed stream of video images (e.g. 1235). This is also shown in FIG. 12C. Video parameters such as the compression algorithm are included within the video settings. In one embodiment of this invention, the compressor, which is determining the scale of each pixel, can count the number of Doppler enhanced pixels in each frame, or image, of the video stream. As discussed above, whether a pixel is grayscale or Doppler enhanced is determined by comparing the red, green, and blue component values. If no Doppler pixel is found in an image, a standard grayscale format, such as ZLN format, can be used as the compression method of the compressor (i.e. Doppler enhanced encoding can be automatically switched off). When a Doppler enhanced pixel is found in a subsequent frame of the video stream by the same counting mechanism, the compressor can automatically be switched to use the Doppler enhanced format described above. The compressor will continue to use this compression method until the counting mechanism fails to detect a Doppler enhanced pixel, then the grayscale only compression method can be switched on again.

ADVANTAGES

Noise Filtering and Image Enhancement

The removal of the least significant bits of pixel values results in high quality decompressed images when the original image is generated by an electronic sensing device, such as an ultrasound machine, which is generating only a certain number of bits of grayscale resolution. By variably altering the number of most significant bits, various filters can be implemented to enhance the image quality. Such a noise filter can be beneficial when the image is generated by an imaging technology such as radar, ultrasound, x-ray, magnetic resonance, or similar technology. Variations can be made to enhance the perceived quality of the decompressed image. Therefore, altering the number of data bits selected and altering the width of the repeat count is anticipated by this invention and specific values in the examples should not be construed as limiting the scope of this invention.

Dynamic Variable Formats

While a video stream is being viewed, a viewer on the decoding end of the transmission can vary the settings for the compressor. Different tradeoffs between image spatial and temporal quality can be made. As the contents of the video signal change an appropriate format can be selected. Control signals can be sent back to the compressor via a communications link.

While a video stream containing Doppler enhancement is being viewed, a viewer on the decoding end of the transmission can vary the settings for the compressor. Different tradeoffs can be made. For example, more Doppler detail can be chosen with slower frame rate.

Automatic Switching

If no Doppler pixel is found in an image, a standard ZLN format can be used (i.e. Doppler enhanced encoding can be automatically switched off). When Doppler enhancement again appears in the video stream (as recognized by the detection of a Doppler pixel in a frame), the Doppler enhanced encoding can automatically be switched on again.

Execution Speed

The preferred embodiment of this invention uses a number of techniques to reduce the time required to compress and decompress the data.

The methods require only a single sequential pass through the data. Both the compression steps 100 and the decompression steps 150 access a pixel once and perform all calculations.

When selecting the filtered pixel value 299, the preferred embodiment selects the low order byte from the 32 bit pixel value 200 or the 24 bit pixel value 210 so that an additional shift operation or addressing operation is avoided.

The shift operation is a fast and efficient way to convert a byte or word to the filtered pixel value 299.

General Purpose

The lossless compression of the sampled data achieved by a preferred embodiment of the present invention results in high quality video streams that have general purpose application in a number of areas including, without limitation, medical, aviation, weather traffic, video conferencing, surveillance, manufacturing, rich media advertising, and other forms of video transmission, storage, and processing.

Lossless Nature/No Artifacts

Once the analog signal is sub-sampled and filtered to select a filtered pixel value that eliminates some of the real world defects, the methods of the present invention compress and decompress the data with no irreversible data loss. Unlike JPEG and MPEG, the decompressed image never suffers from artificially induced blocking or smearing or other artifacts that are result of the lossy compression algorithm itself. As a result even a small sub-sample of the image remains clear and true to the perceived quality of the original image.

Superior Features over RHN Format

When compared against the RHN format, the format and methods of the present invention provide a number of advantages, including, but not limited to, faster speed and smaller size of encoded data, better performance for both medical and typical video images, and a typically closer representation of the original video signal.

Superior Features over ZLN Format

When compared against the ZLN format, the format and methods of the Doppler improvement aspect of the present invention provide a number of advantages, including, but not limited to, a typically closer representation of the original video signal. As stated above, when compared to a method using all three or four color components, the Doppler improvement aspect of the present invention provides the advantages of efficient encoding of Doppler enhanced images and reduced size of an encoded data buffer that contains Doppler enhancement.

Optimal Encoding

The present invention also provides a method for separating a video image into distinguishable regions. Each region can be encoded, compressed, and transferred in a manner that is optimal for its distinguishing characteristics.

Reduced Size

The present invention may also reduce the size of an encoded video stream. The reduced size saves in the usage and cost of storage devices and computing and networking resources.

Reduced Bandwidth

The present invention may also reduce the bandwidth required to transfer a compressed video stream. Both transfers within a computer system to a storage device, such as a hard disk, tape drive, and the like, and transfers between a transmitter and a receiver over a network, such as a LAN, the Internet, a television network, and the like, are improved.

This improved bandwidth allows for the regions of interest to be displayed at a higher quality of resolution and motion while reducing the requirements and cost of a high bandwidth connection or a connection with reduced traffic. For example, the present invention allows a video steam that previously had to be sent over a 1.54 Mb T1 line to be sent over a much less costly and much more prevalent DSL, cable modem, or 56 Kb modem connection.

Efficient Doppler Handling

The present invention also provides efficient methods for handling Doppler enhanced images. This allows for lower cost storage of weather, air traffic, and medical images. It also allows for enhanced quality of images.

CONCLUSION, RAMIFICATION, AND SCOPE

Accordingly, the reader will see that the compression and decompression steps of the present invention provide a means of digitally compressing a video signal in real time, a means of digitally compressing Doppler enhanced video signal in real time, communicating the encoded data stream over a transmission channel, and decoding each frame and displaying the decompressed video frames in real time.

Furthermore, the present invention has additional advantages in that:
1. it provides a means of filtering real world defects from the video image and enhancing the image quality;
2. it allows for execution of both the compression and decompression steps using software running on commonly available computers without special compression or decompression hardware;
3. it provides decompressed images that have high spatial quality that are not distorted by artifacts of the compression algorithms being used;
4. it provides a variably scalable means of video compression and of adding Doppler enhancement; and
5. it provides a means for reducing the space required in a storage medium.

While my above descriptions contain several specifics these should not be construed as limitations on the scope of the invention, but rather as examples of some of the preferred embodiments thereof. Many other variations are possible. For example, bit ordering can be altered and the same relative operation, relative performance, and relative perceived image quality will result. Also, these processes can each be implemented as a hardware apparatus that will improve the performance significantly. In another example, frame differencing may be applied to the input stream to select a subset of a frame to be the original image, or a post processing step could be added to remove artifacts introduced by a particular decompression method.

Accordingly, the scope of the invention should be determined not by the embodiments illustrated, but by the appended claims and their legal equivalents.

I claim:

1. A method comprising:
   decoding a codeword, by a decoder, to recover a pixel value of a pixel of a Doppler enhanced grayscale image, and a flag associated with the pixel, wherein a Doppler enhanced grayscale image comprises grayscale pixels and Doppler enhancement pixels, and wherein a Doppler enhanced grayscale image is captured as a color image;
   determining, by the decoder, whether the pixel is a grayscale pixel or a Doppler enhancement pixel, using the flag; and
   outputting, by the decoder, a grayscale pixel or a Doppler enhancement pixel, based on a result of said determining.

2. The method of claim 1, further comprising determining, by the decoder, a Doppler scale of the pixel, on determining that the pixel is a Doppler enhancement pixel.

3. The method of claim 2, wherein the flag is a first flag, and recovering comprises recovering the pixel value, the first flag and a second flag; wherein the method further comprises determining, by the decoder, a Doppler scale of the pixel, based on the second flag; wherein outputting of a Doppler enhancement pixel is further based on the determined Doppler scale.

4. An apparatus comprising:
   a receiver configured to receive a codeword;
   a decoder coupled with the receiver, and configured to decode the codeword to recover a pixel value of a pixel of a Doppler enhanced grayscale image, and a flag associated with the pixel, determine whether the pixel is a grayscale pixel or a Doppler enhancement pixel, using the flag, and output a grayscale pixel or a Doppler enhancement pixel, based on a result of the determination;
   wherein a Doppler enhanced grayscale image comprises grayscale pixels and Doppler enhancement pixels; and
   wherein a Doppler enhanced grayscale image is captured as a color image.

5. The apparatus of claim 4, wherein the decoder is further configured to determine a Doppler scale of the pixel, when the pixel is determined to be a Doppler enhancement pixel.

6. The apparatus of claim 5, wherein the flag is a first flag, and recover comprises recover the pixel value, the first flag and a second flag; wherein the decoder is further configured to determine a Doppler scale of the pixel, based on the second flag; wherein output of a Doppler enhancement pixel is further based on the determined Doppler scale.

7. At least one non-transitory computer-readable storage device, comprising: a plurality of computer programming instructions stored in the storage device, and configured to enable an apparatus, in response to execution of the computer programming instructions by the apparatus, to:
   decode a codeword to recover a pixel value of a pixel of a Doppler enhanced grayscale image, and a flag associated with the pixel, wherein a Doppler enhanced grayscale image comprises grayscale pixels and Doppler enhancement pixels, and wherein a Doppler enhanced grayscale image is captured as a color image;
   determine whether the pixel is a grayscale pixel or a Doppler enhancement pixel, using the flag; and
   output a grayscale pixel or a Doppler enhancement pixel, based on a result of the determining.

8. The storage device of claim 7, further comprising determination, by the decoder, a Doppler scale of the pixel, on determination that the pixel is a Doppler enhancement pixel.

9. The storage device of claim 8, wherein the flag is a first flag, and recover comprises recover the pixel value, the first flag and a second flag; wherein the method further comprises determination, by the decoder, a Doppler scale of the pixel, based on the second flag; wherein output of a Doppler enhancement pixel is further based on the determined Doppler scale.

* * * * *